(12) United States Patent
McKevitt et al.

(10) Patent No.: US 10,646,773 B2
(45) Date of Patent: May 12, 2020

(54) MOBILE DEVICE GAMING APPLICATION FOR A PUZZLE MODE

(71) Applicant: KingsIsle Entertainment Incorporated, Plano, TX (US)

(72) Inventors: Carl Henry McKevitt, Austin, TX (US); Albert Gallatin McDaniel, V, Austin, TX (US)

(73) Assignee: KingsIsle Entertainment Incorporated, Plano, TX (US)

( * ) Notice: Subject to any disclaimer, the term of this patent is extended or adjusted under 35 U.S.C. 154(b) by 765 days.

(21) Appl. No.: 15/087,164

(22) Filed: Mar. 31, 2016

(65) Prior Publication Data

US 2017/0282055 A1    Oct. 5, 2017

(51) Int. Cl.
*A63F 9/10* (2006.01)
*G07F 17/34* (2006.01)
(Continued)

(52) U.S. Cl.
CPC .............. *A63F 9/10* (2013.01); *A63F 9/0612* (2013.01); *A63F 13/2145* (2014.09);
(Continued)

(58) Field of Classification Search
CPC .......... A63F 9/10; A63F 9/0612; A63F 13/80; A63F 13/25; A63F 13/2145; G07F 17/34
See application file for complete search history.

(56) References Cited

U.S. PATENT DOCUMENTS 8,671,058 B1 * 3/2014 Isaacs .................... G06F 21/36
                                                              382/100
8,926,417 B1    1/2015 Pulido
(Continued)

FOREIGN PATENT DOCUMENTS

WO    WO2013155228 A1    10/2013

OTHER PUBLICATIONS

PCT International Search Report and Written Opinion of the International Searching Authority, PCT/US2017/024297, dated Jun. 5, 2017, 11 pages.
(Continued)

*Primary Examiner* — Kang Hu
*Assistant Examiner* — Thomas H Henry
(74) *Attorney, Agent, or Firm* — Fish & Richardson P.C.

(57) ABSTRACT

The present disclosure relates to computer-implemented methods, computer-readable media, and computer systems for gameplay operations related to a puzzle-based game. In one example, a method can include identifying a puzzle for use in a jigsaw puzzle application, the puzzle comprising a set of puzzle pieces forming a puzzle image. The puzzle is divided into a subset of chunks including mutually exclusive sets of interconnected pieces. The puzzle is presented to a player, where the presented puzzle illustrates the set of puzzle pieces and includes prompting the player to select a particular piece as a starting piece. In response, the chunk associated with the particular piece is identified. An area for solving the identified chunk associated with the particular piece is presented, where the area includes a solution area for solving the identified chunk and a player hand area for providing potential pieces for solving the identified chunk.

20 Claims, 19 Drawing Sheets

(51) Int. Cl.
   *A63F 9/06* (2006.01)
   *A63F 13/80* (2014.01)
   *A63F 13/2145* (2014.01)
   *A63F 3/00* (2006.01)
   *A63F 13/25* (2014.01)

(52) U.S. Cl.
   CPC .............. *A63F 13/25* (2014.09); *A63F 13/80* (2014.09); *G07F 17/34* (2013.01); *A63F 2003/00996* (2013.01); *A63F 2300/1075* (2013.01)

(56) References Cited

U.S. PATENT DOCUMENTS

| | | | |
|---|---|---|---|
| 2008/0102912 A1* | 5/2008 | Tawara | A63F 13/10 463/9 |
| 2009/0258687 A1 | 10/2009 | Weichselbaum | |
| 2013/0079079 A1* | 3/2013 | Bouchard | A63F 9/0612 463/9 |
| 2013/0203492 A1* | 8/2013 | Yum | A63F 13/06 463/31 |
| 2013/0244784 A1 | 9/2013 | Assa | |
| 2014/0206423 A1* | 7/2014 | Weed | A63F 9/0612 463/9 |

OTHER PUBLICATIONS

PCT International Preliminary Report on Patentability in International Application No. PCT/US2017/24297, dated Jun. 21, 2018, 10 pages.

\* cited by examiner

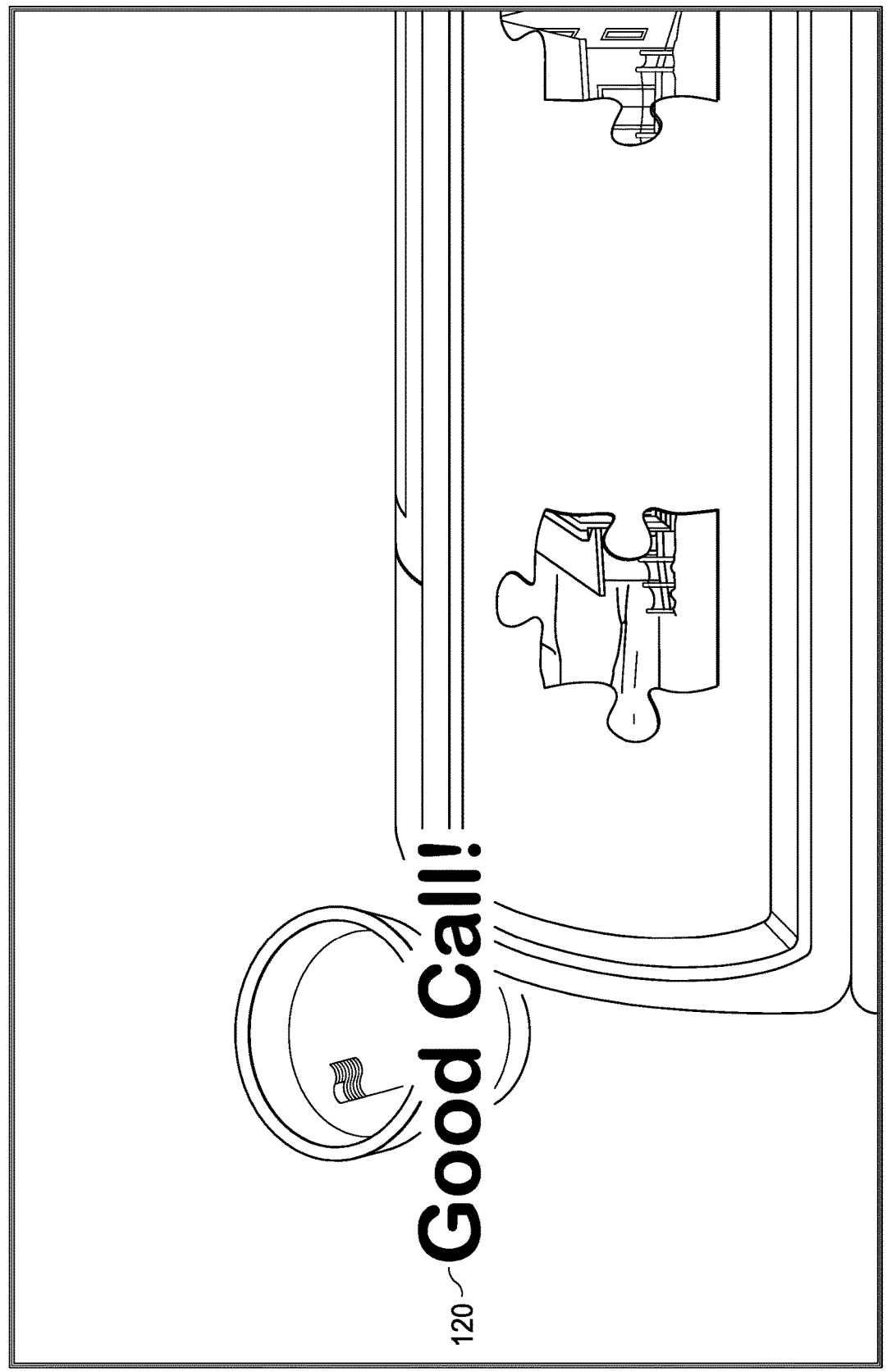

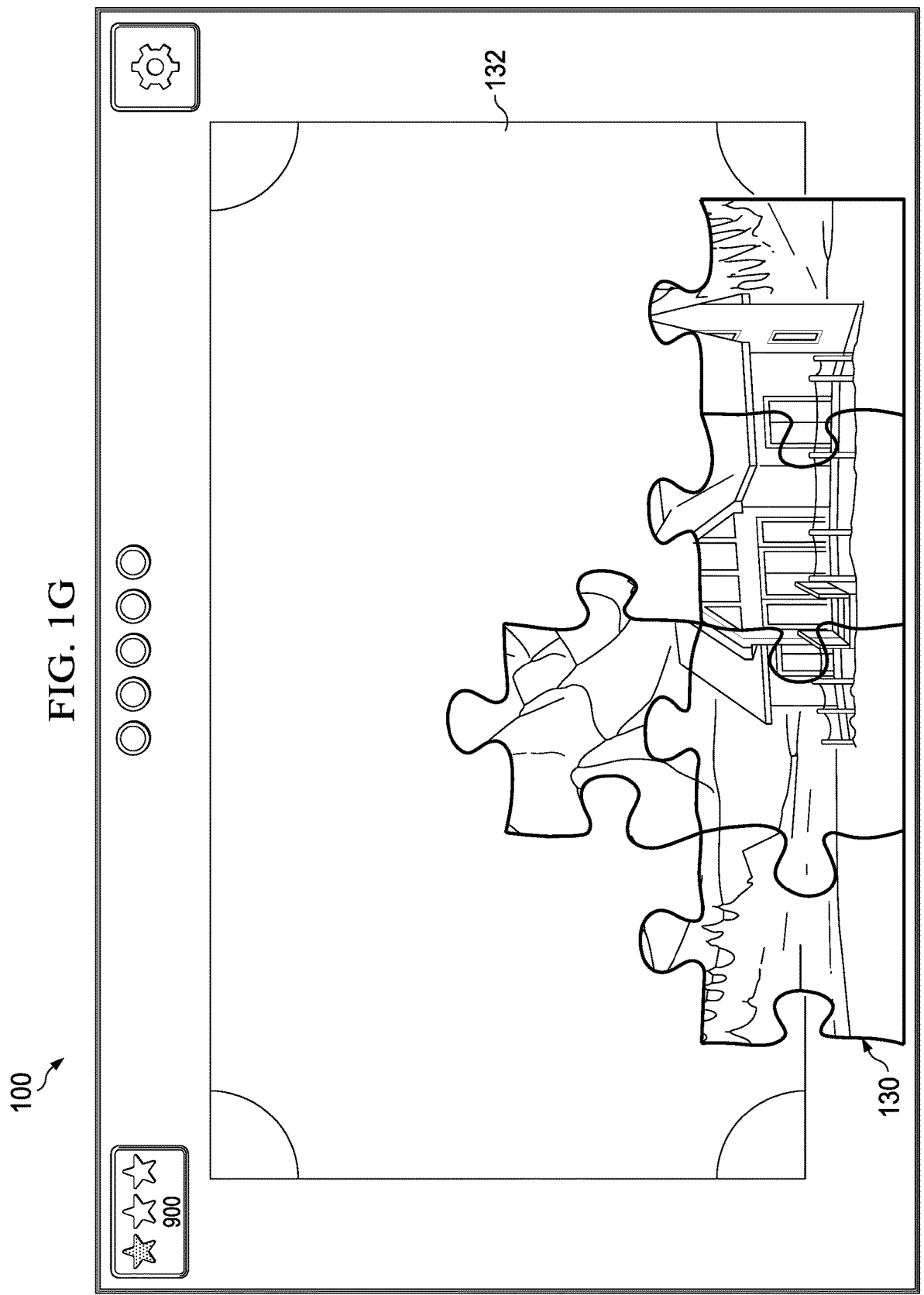

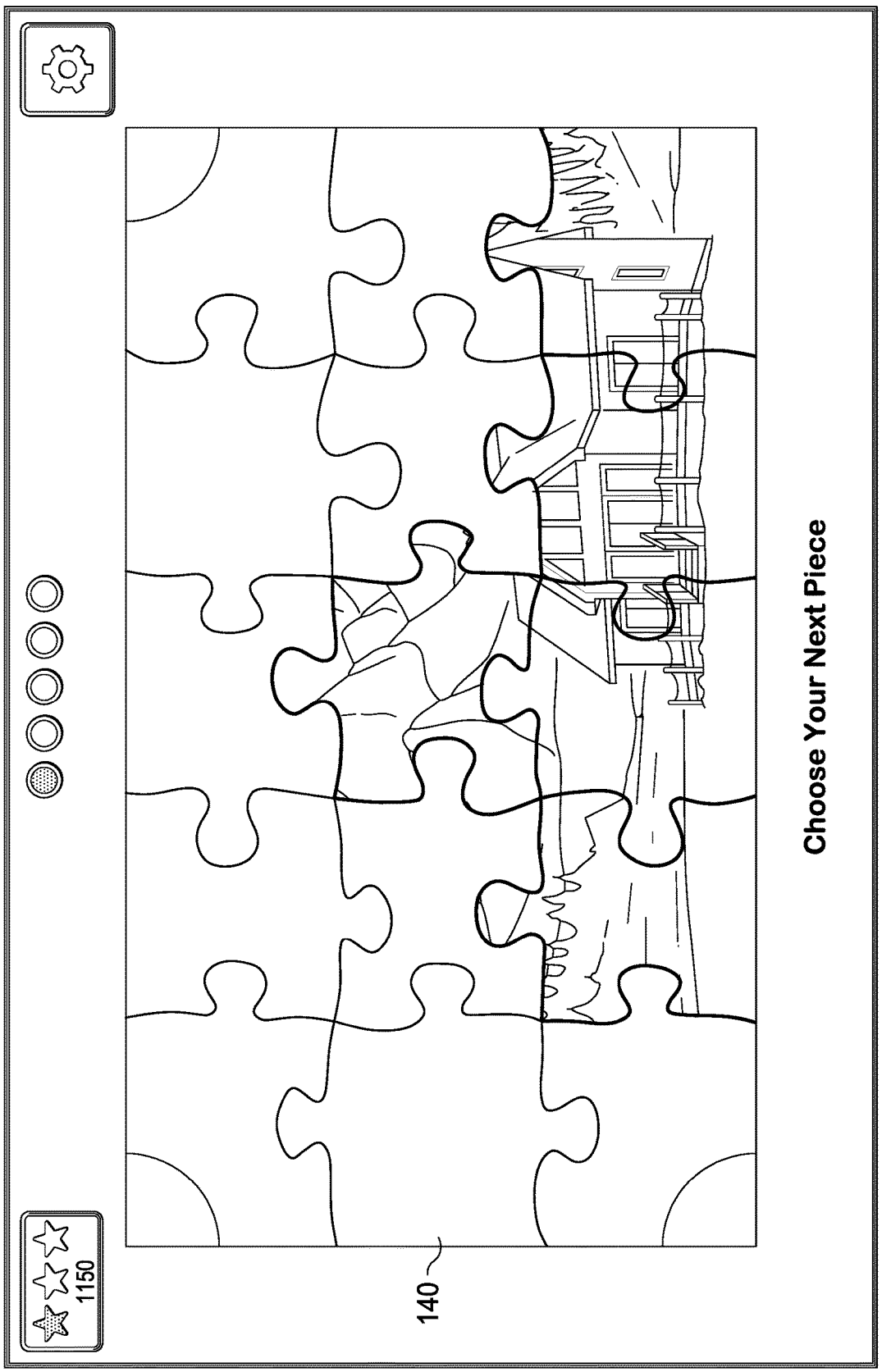

MOBILE DEVICE GAMING APPLICATION FOR A PUZZLE MODE

TECHNICAL FIELD

The present disclosure relates to computer systems and computer-implemented methods for gameplay operations and solutions related to an enhanced puzzle-based game.

By 2018, estimates place revenue for gaming software as high as $110 billion or more, with over $45 billion of that estimated amount associated with mobile gaming alone. Mobile gaming provides players with the ability to play at any convenience time and place, including while traveling, at home, during breaks at work, and generally during leisure time. Unlike console gaming, however, players are generally limited to displays provided on their mobile device, anywhere from 3.5 inches for smaller mobile phones to 12.9 inches for the largest tablets. In many cases, the display size may hinder accurate recreations for some games, including board and puzzle games that require a larger area for game pieces and presentation.

SUMMARY

The present disclosure relates to computer-implemented methods, computer-readable media, and computer systems for gameplay operations and solutions related to an enhanced puzzle-based game.

In one example, a method can include identifying a puzzle for use in a jigsaw puzzle application, the puzzle comprising a set of puzzle pieces which combine to form a puzzle image, where each of the puzzle pieces illustrate a portion of the puzzle image. The identified puzzle is divided into a subset of chunks, each chunk associated with a mutually exclusive set of pieces, where the pieces of the chunk are interconnected. The identified puzzle is presented to a player via a user interface, where the presented puzzle illustrates the set of puzzle pieces. Presenting can include prompting, via the user interface, the player to select a particular piece as a starting piece. In response to receiving selection of a particular piece by the player, the chunk associated with the particular piece is identified. An area for solving the identified chunk associated with the particular piece is presented, where the area includes a solution area for solving the identified chunk and a player hand area for providing potential pieces for solving the identified chunk.

In some implementations, upon initial presentation of the area for solving the identified chunk associated with the particular piece the solution area includes the selected piece. In other implementations, the player hand area is presented adjacent to a bottom edge of the user interface. The player hand area can be populated with a set of potential pieces for solving the identified chunk, wherein the identified chunk is solved by receiving placement of the potential pieces into the solution area in locations relative to previously placed pieces. In some instances, the player hand area is configured to present a first number of potential pieces, and wherein the set of potential pieces for solving the identified chunk includes a second number higher than the first number, the method further comprising providing a first set of potential pieces for solving the identified chunk in the player hand area, determining that all pieces in the first set of provided potential pieces have been played, and in response to the determination, providing a second set of potential pieces for solving the identified chunk in the player hand area.

In some instances, the set of potential pieces for solving the identified chunk includes at least one dud piece. The at least one dud piece may comprise an altered version of a piece in the set of potential pieces, wherein the at least one dud cannot be placed within the identified chunk and the current puzzle. Alternatively or in addition, the at least one dud piece may comprise a piece included in a different chunk than the identified chunk, wherein the at least one dud cannot be placed within the identified chunk.

In some instances, the method may further include identifying a player selection of a particular one of the potential pieces from the player hand area, monitoring a touch-input based placement of the particular potential piece within the solution area, and determining a score associated with the monitored touch-input based placement of the particular potential piece. The score associated with the monitored touch-input based placement of the potential piece can be based on an accuracy-based determination of the where the potential piece is placed as compared to a correct location in the identified chunk where the potential piece is to be placed. In some instances, the touch-input based placement comprises a dragging input via the user interface from the potential piece in the player hand to the location of the placement, wherein the score associated with the monitored touch-input based placement of the potential piece is based on a route of the dragging input from the player hand to the location of the placement of the potential piece. In some instances, where the selected particular one of the potential pieces from the player hand is a dud piece, the score associated with the monitored touch-input based placement of the potential piece can be based on a determination of whether the dud piece was placed in a discard location within the solution area or the player hand area. The method may further include presenting a puzzle frame for placement of the completed chunk in response to determining completion of the identified chunk, monitoring a touch-based placement of the completed chunk within the puzzle frame, and determining a score associated with the monitored touch-input based placement of the particular completed chunk. The method may still further include, in response to the placement of the completed chunk, determining if additional chunks remain to be completed within the puzzle. If no further chunks remain, completing the puzzle. If additional chunks remain to be completed, presenting all completed chunks within the puzzle frame, presenting an indication of each of the puzzle pieces not included in a previously completed chunk within the puzzle frame, and prompting, via the user interface, the player to select a new particular piece from the indicated puzzle pieces not included in as a starting piece. In response to receiving selection of the new particular piece by the player, the new chunk associated with the new particular piece can be identified, and an area for solving the identified new chunk associated with the new particular piece can be presented, where the area includes a solution area for solving the identified new chunk and a player hand area for providing potential pieces for solving the identified new chunk.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A-L are example illustrations and screenshots of particular example implementations of a mobile puzzle game, including illustrations of its gameplay and interface.

DETAILED DESCRIPTION

The present disclosure describes example systems and methods for gameplay solutions and operations related to an enhanced puzzle-based game. In particular, the present disclosure describes gameplay revolving around players assembling Jigsaw puzzles in a chunk-by-chunk fashion using a plurality of mobile device-optimized solutions.

The solution described herein provides a number of benefits, as well as advantages over prior jigsaw puzzle applications. For one, the mobile gaming solution described allows for larger puzzles to be easily translated to mobile screens. By separating puzzles into smaller chunks, the typical difficulties caused by the smaller screens of mobile devices, even larger tablets, are removed. Players on even the smallest devices can participate in solving jigsaw puzzles, while also incorporating and rewarding player skill through points and bonuses for speed and accuracy based on their visual acuity and memory. Further, elements of luck can be incorporated into the process by providing a jackpot-based power up system. Still further, multiplayer modes can be applied to the game, allowing players to matchup head-to-head versus other players, in real-time or asynchronously. In general, the mobile game allows for advanced players to compete competitively with friends and strangers, while casual players can enjoy a new, convenient way to play their game.

Figure 1A:
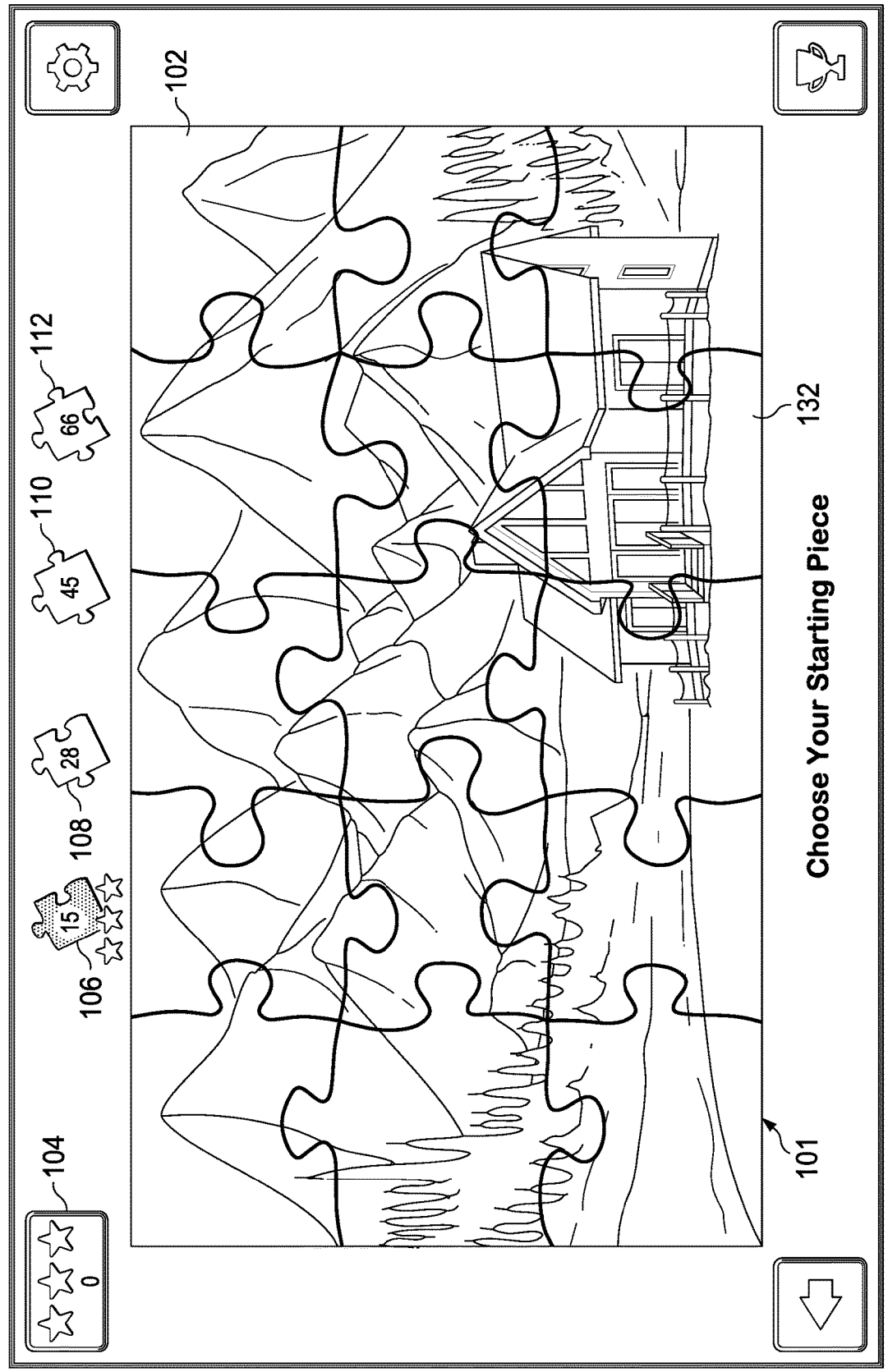

FIG. 1A-L are example illustrations and screenshots of particular example implementations of a mobile puzzle game, including illustrations of its gameplay and interface. FIG. 1A includes an illustration of an example game interface in its initial state after a puzzle image and corresponding difficulty level are selected. As illustrated, the puzzle image 101 represents a picture of a dog in leaves, where image 101 is located within a puzzle frame 132. In the present instance, four levels of difficulty are provided as options—a 15 piece puzzle (106), a 28 piece puzzle (108), a 45 piece puzzle (110), and a 66 piece puzzle (112). Additional numbers of pieces may be available in other instances. Additionally, difficulty may be based on one or more other factors other than just the number of pieces. For example, players may select other types of difficulty that modify the playing experience, including but not limited to a selection of difficulties, such as puzzle piece shape, chunk sizes, and dud pieces included in player hands (all described below). In addition to the number of pieces, these selections can allow players to customize their gaming experience.

Once the player has selected their difficulty level, the various pieces of the puzzle image 101 are illustrated with their jigsaw orientations. The player is instructed to choose a particular starting piece with which to begin playing the puzzle. Any particular piece can be selected at this time. In the current illustration, puzzle piece 102 is selected.

Figure 1B:
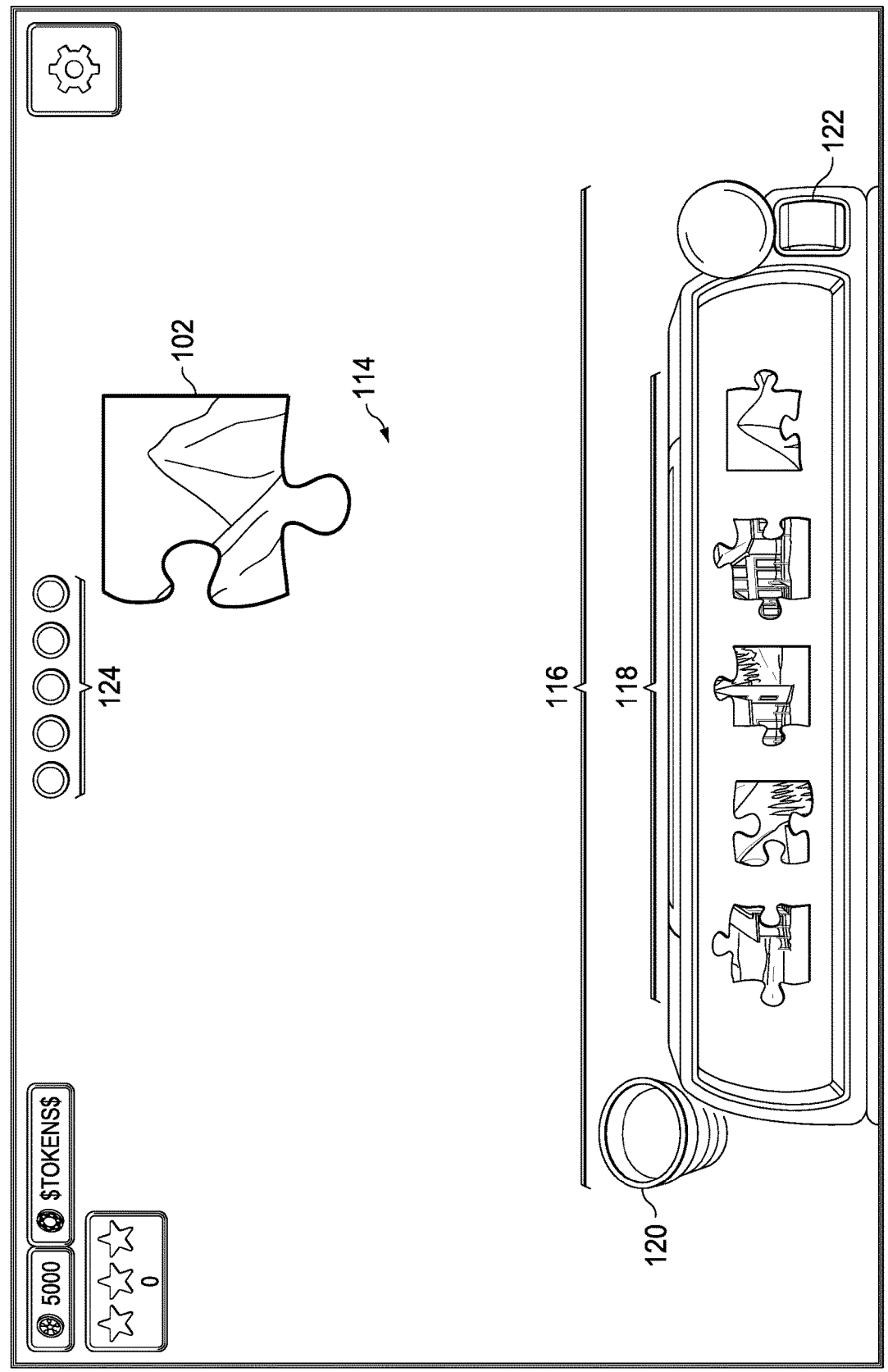

FIG. 1B illustrates the game interface after puzzle piece 102 is selected. In some instances, the transition from FIG. 1A to FIG. 1B may be presented by a "waterfall" effect or other animation, where the non-selected puzzle pieces leave the game board. At this stage, a chunk associated with the selected piece 102 is determined, where the chunk represents a mutually exclusive subset of pieces representing a portion of the puzzle image 101. The chunks may be divided based on a number of factors, including the player's display, the difficulty settings associated with the current puzzle, and other relevant factors. Once the initial piece is selected, the other pieces included in the chunk are identified and can be used to solve the smaller portion of the overall puzzle image 101. The number of pieces in any particular chunk may vary, both across different puzzles (i.e., based on particular puzzles' difficulty) and between different chunks in the same puzzle. Additionally, chunk sizes and distributions can change from puzzle instance to puzzle instance, even on the same puzzle and difficulty. Randomization can create a different experience each time the player begins a new puzzle or instance of the same puzzle.

As illustrated in FIG. 1B, the selected piece 102 can be placed into a chunk interface or chunk solution area 114. A set of pieces 118, referred to as a "hand" of pieces, are presented at the bottom of the illustration. In this instance, the hand of pieces 118 is an assortment of puzzle pieces to be used in potentially solving the particular chunk with which the selected piece 102 is associated. In some instances, a hand may start with any number of pieces, where those pieces are selected and placed within the chunk interface 114 to solve the chunk. In some instances, one or more of the pieces may be duds, where those duds do not correspond to any piece in the chunk. In some instances, those pieces may be associated with another chunk, may be mirror or reverse versions of a piece associated with the current chunk, or may be shaped such that the piece cannot fit in the current chunk, among others. In some instances, the dud may be a mirrored or generally altered version of an otherwise usable piece. In those instances, as well as instances where the dud is not just an altered version of an otherwise useable piece, the dud piece may be a piece that cannot be placed anywhere in the current puzzle, not just another piece from the same puzzle in a different chunk. To alter the piece, an existing piece from either within the chunk or within the puzzle as a whole can be mirrored such that the piece does not fit within the puzzle. Alternatively, the positioning of the texture coordinates of the dud piece can be modified such that the image on the piece does not align with the images on the pieces actually belonging within the current chunk. In solving the chunk, the player may need to discard such duds into a trash area 120 in order to remove them from the playing area. In some instances, more pieces than can fit in the hand 118 may be included in a chunk, such that more than one hand 118 may be presented. For example, each piece in a hand may be discarded to trash 120 if they are a dud or placed into the puzzle if they fit, where the pieces are not replaced until each of the original hand is used. At that point, the hand 118 may be refreshed with a new set of pieces, possibly including one or more new duds. In other instances, as a piece is played or discarded, a new piece can be added to the hand 118, such that the hand 118 is only empty and not restocked when no more pieces associated with the current chunk are available.

FIG. 1B also includes lever 122 used for power-up jackpots described below, as well as score multiplier 124. The entire lower area may be considered the hand area 116, including the hand 118, lever 122, and trash 120.

Figure 1C:
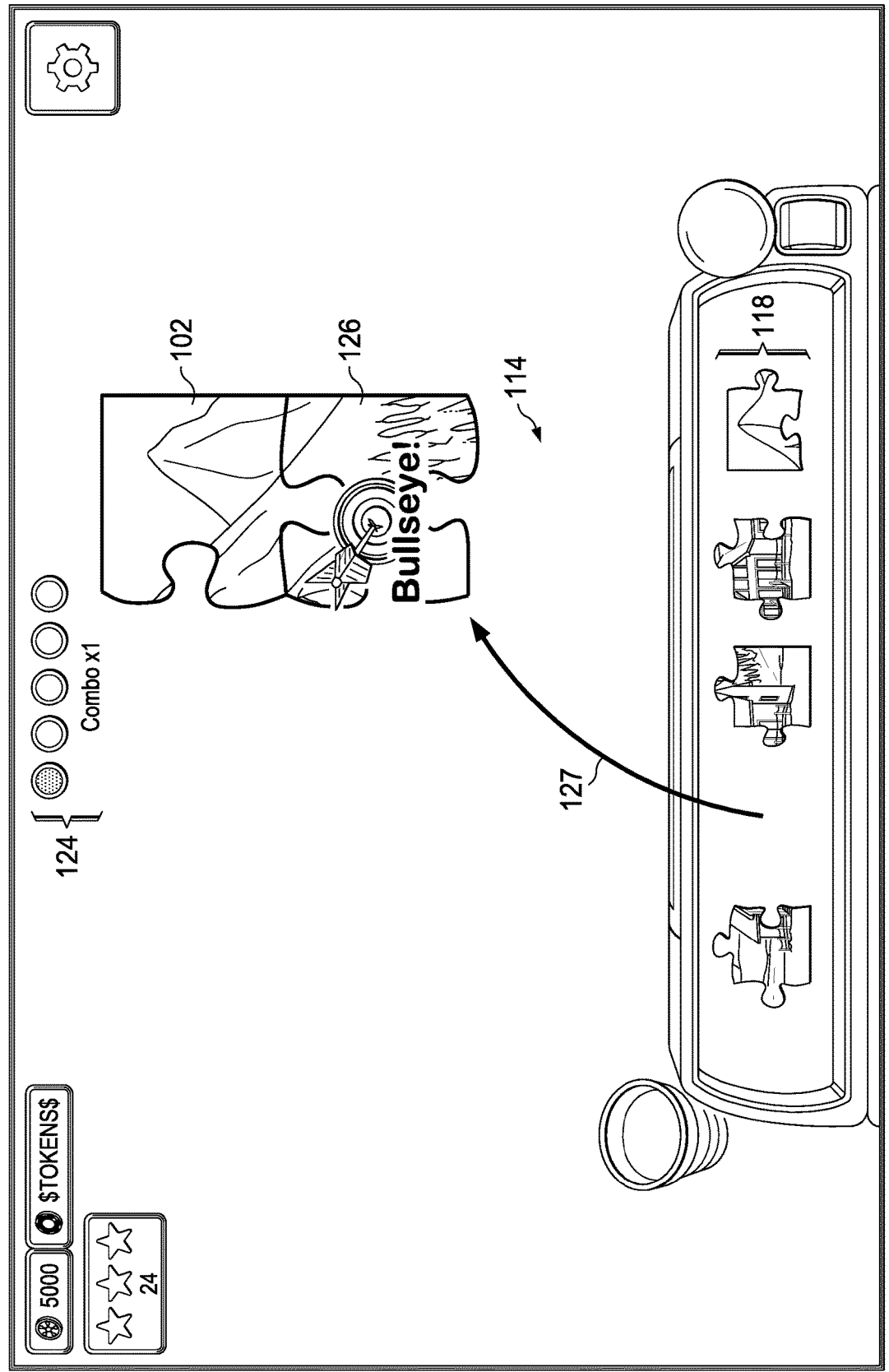

FIG. 1C illustrates a correct application of a piece 126 from the hand 118 to a connection to the starting piece 102. Path 127 shows the path taken via a touch-based input through a touchscreen of the mobile device. In some instances, particularly where multiple possible locations for a piece exist, the path 127 may not be a straight line. In some instances, the score of placing the piece may be based, at least in part, on the directness of the path taken from the hand 118 to the correct location within the puzzle. Here, path 127 was a direct line, possibly resulting in a full point or score value for the portion related to the line of placement, or "b-line." In some instances, a visualization of the line of placement may be provided to the user during and/or after the placement of the piece, such as in response to the piece's placement. For example, path 127 may be represented in some implementations as a distinct line indicating the line of placement from the hand 118 to the placement location 126. Additionally, scoring can be based on the location at which the piece 126 is released. If the piece 126 is released in the exact spot in which it should be placed, a full location point or score value can be awarded. The location may be relative, with some relative degree of accuracy being considered. The accuracy of the placement of particular pieces needed to qualify as "bullseye," "great," and "good" (among others) may vary based on difficulty, where higher difficulty levels require a more precise placement for full accuracy points. Similarly, a lower difficulty may provide a wider relative location area for determining accuracy. The difficulty may also determine how close a piece needs to be placed in order to be "correct" and placed in the chunk interface 114. The threshold may be determined based on screen size, difficulty level, and other suitable factors. If the placement of the piece is determined to be outside of the threshold, the placement may be rejected. In response to the rejection, the piece may be placed back into hand 118 with an indication of incorrect placement, or the piece may be placed into the correct location within the chunk interface 114 with no points, or a deduction of points, being awarded. As illustrated, upon the correct placement of FIG. 1C, the score multiplier 124 is updated based on the first correct placement. As consecutive correct placements are made, the score multiplier 124 can be updated, allowing for higher possible scores to be received by players.

Figure 1D:
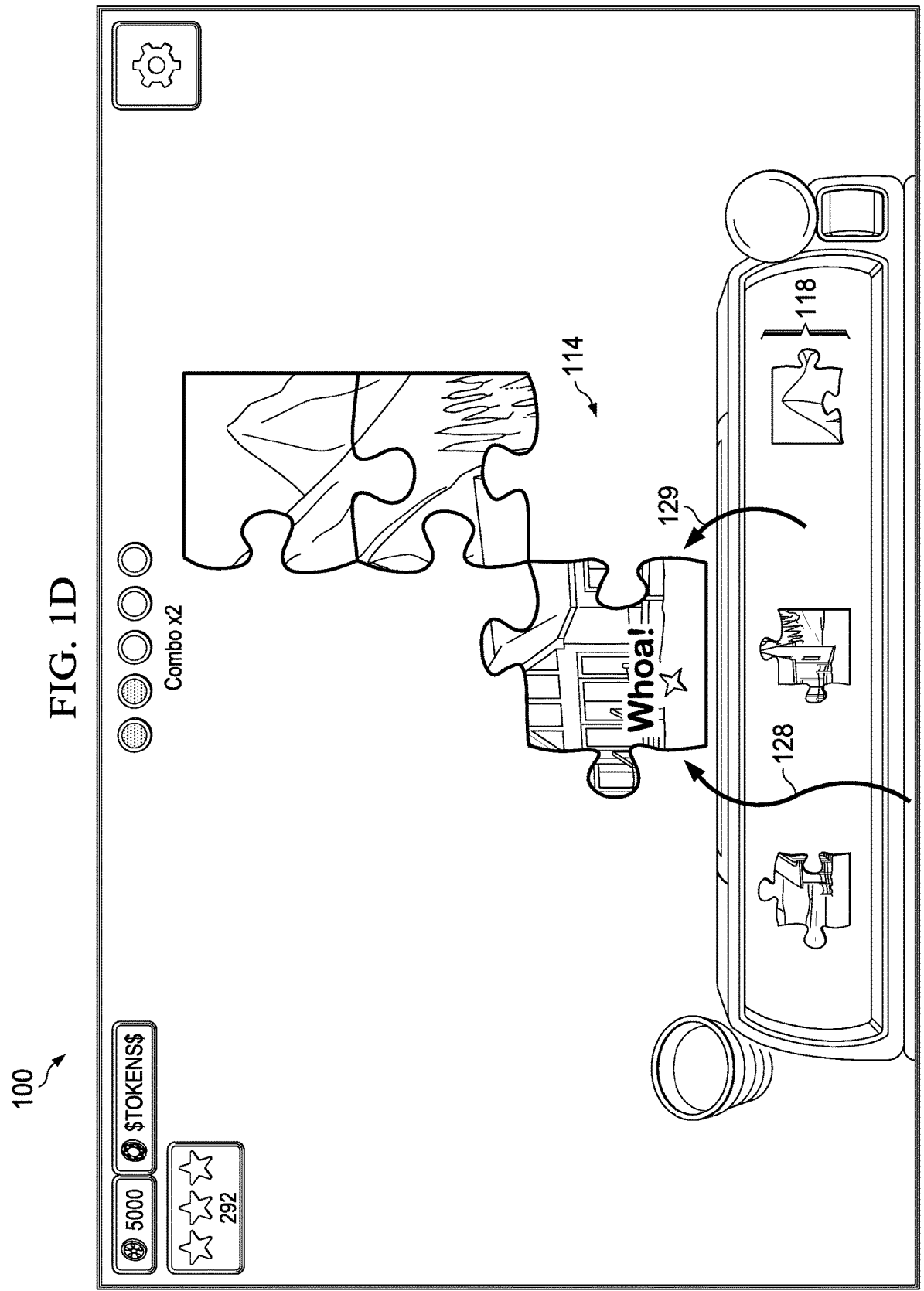

FIG. 1D illustrates another correct placement of a piece 128 from hand 118 into the chunk interface 114. In this instance, however, the piece 128 is placed in a free-floating location—in other words, the piece 128 is not connected to another piece but is correctly located in the chunk interface 114 relative to the already placed pieces. The piece 128 will eventually connect to one or more other pieces in the chunk, but has been placed prior to having any direct connections. In such instances, the player may be awarded with a higher score than when connections are awarded, including potential bonus points for the farther away from prior placed pieces the free-floating piece is placed. The path 129 to place piece 128 was slightly curved, causing a slight deduction in the points awarded for the b-line score. As illustrated, the score multiplier 124 is updated based on the second consecutive correct placement. Three pieces remain in the hand 118.

Figure 1F:
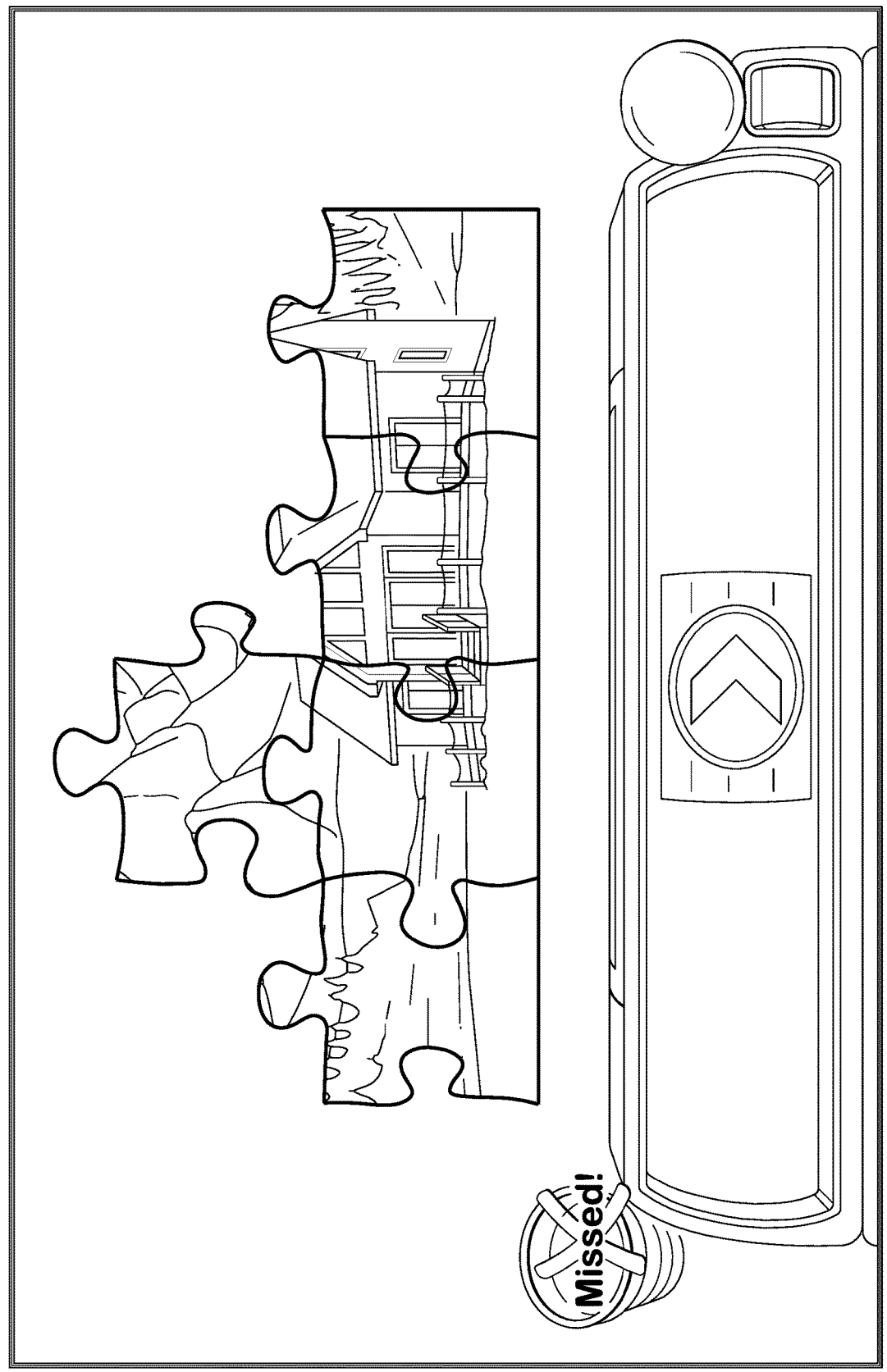

FIG. 1E illustrates an example piece from hand 118 being correctly placed in trash 120. Pieces are placed in to the trash 120 where a dud piece is identified by the player that does not connect to the current chunk being completed. Points are awarded for successfully discarding dud pieces. FIG. 1F illustrates the result of a player attempting to discard a piece that belongs in the chunk. In such instances, a "missed" or other notification is presented and the piece is snapped into the proper position within the chunk. Similarly, trying to place a dud piece into the puzzle may cause the piece to vanish and present a notification to the player of their error. Points can be deducted or no points may be awarded. Further, any current combos associated with the score multiplayer 124 will be removed in response to an incorrect placement, an attempt to place a dud within the chunk, or an attempt to place a piece included in the chunk into the trash 120.

Figure 1H:
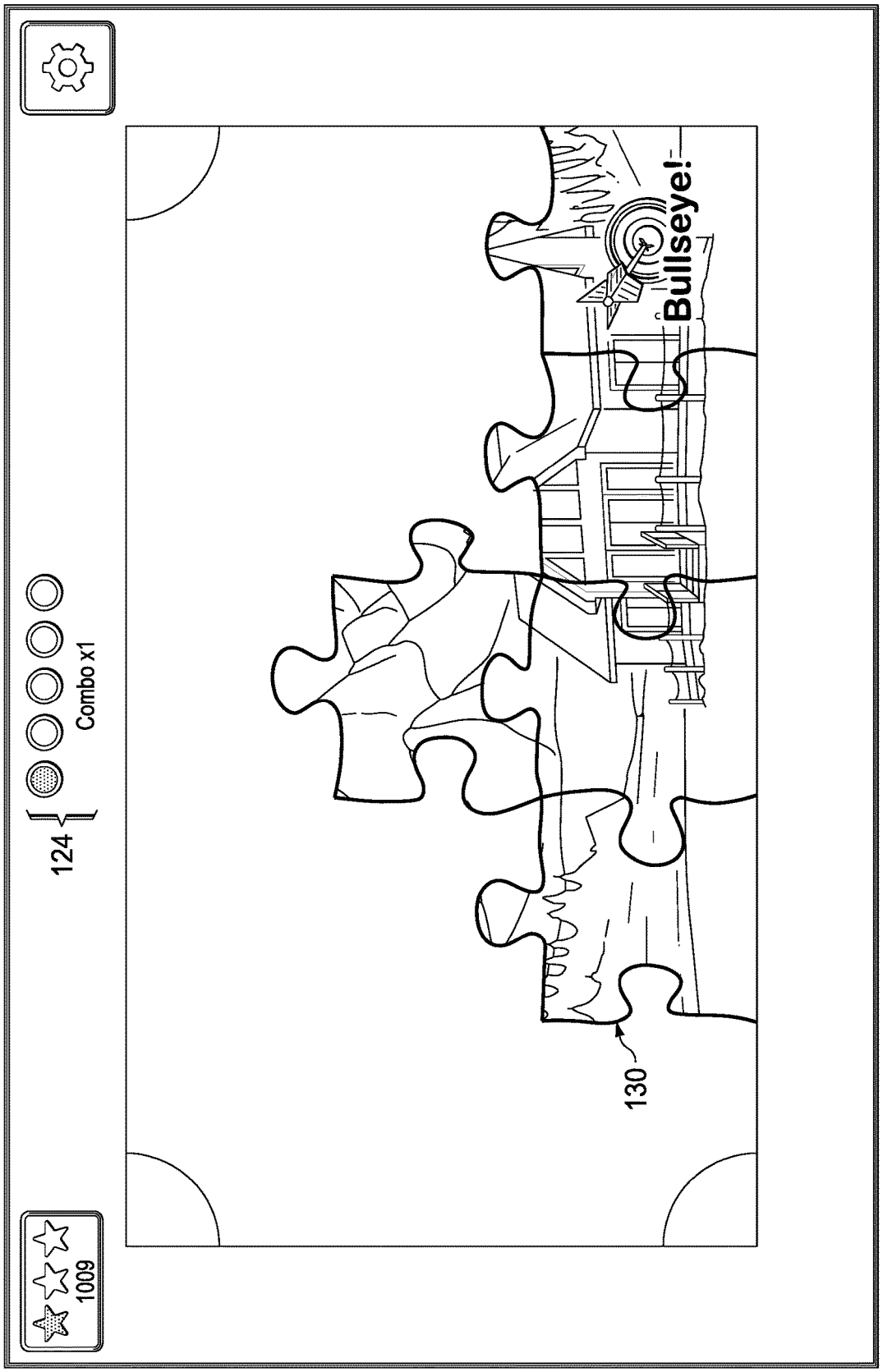

FIG. 1G illustrates the placement of a completed chunk 130 into the puzzle frame 132. Once a chunk has been fully assembled, the chunk is placed into the frame 132. As noted, some chunks 130 may include one or more hands of pieces to be completed. Similar to chunk building, players are awarded points for accuracy in placing the completed chunk 130 into the puzzle frame 132. FIG. 1H shows the chunk 130 successfully placed into the frame 132. In placing the chunk 130 correctly, the score multiplier 124 is updated based on the corrected placement.

Figure 1J:
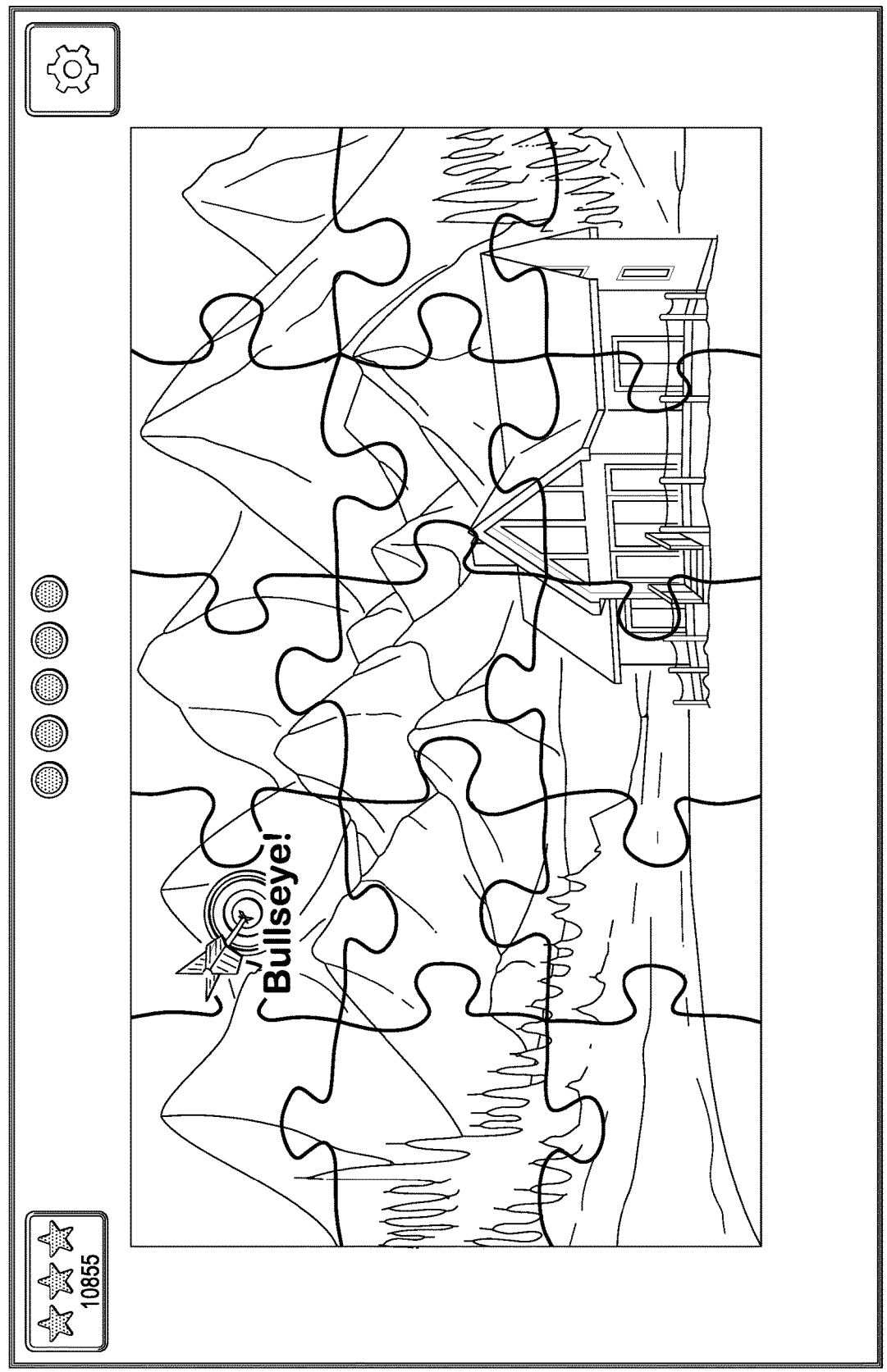
Figure 1K:
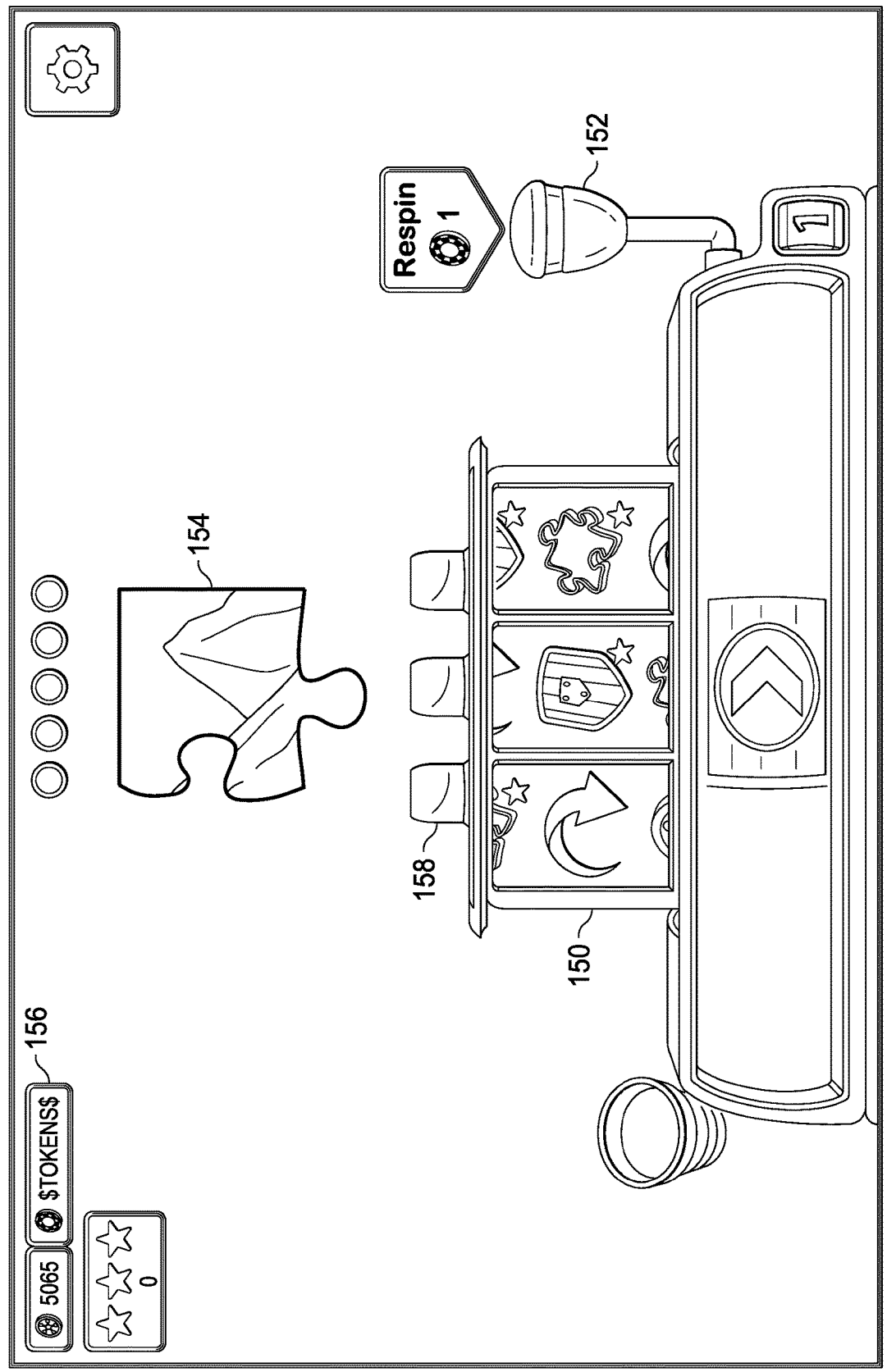

FIG. 1I illustrates the situation after a chunk is placed and additional chunks remain. Here, the remaining pieces in the puzzle are outlined and presented for selection. The player is directed to select a next piece to work on. Upon selection, e.g., of piece 140, a new chunk corresponding to that selected piece is presented for solution. That is, the selected piece 140 is presented a chunk interface along with a new hand of pieces associated with the new chunk, and a process similar to those illustrated in FIGS. 1B-1F are performed for the completion and subsequent placement of the new chunk. Similar processes can be performed until all chunks have been solved and placed. FIG. 1J shows a complete puzzle image 101 after all chunks have been solved and placed. Throughout the process, players are awarded stars based on the score they achieved throughout solving the various chunks and full puzzle. The stars determine the player's award in coins, which are used to purchase more puzzles, and mastery points, which can allow players to rank themselves against friends or other players from around the world.

Figure 1L:
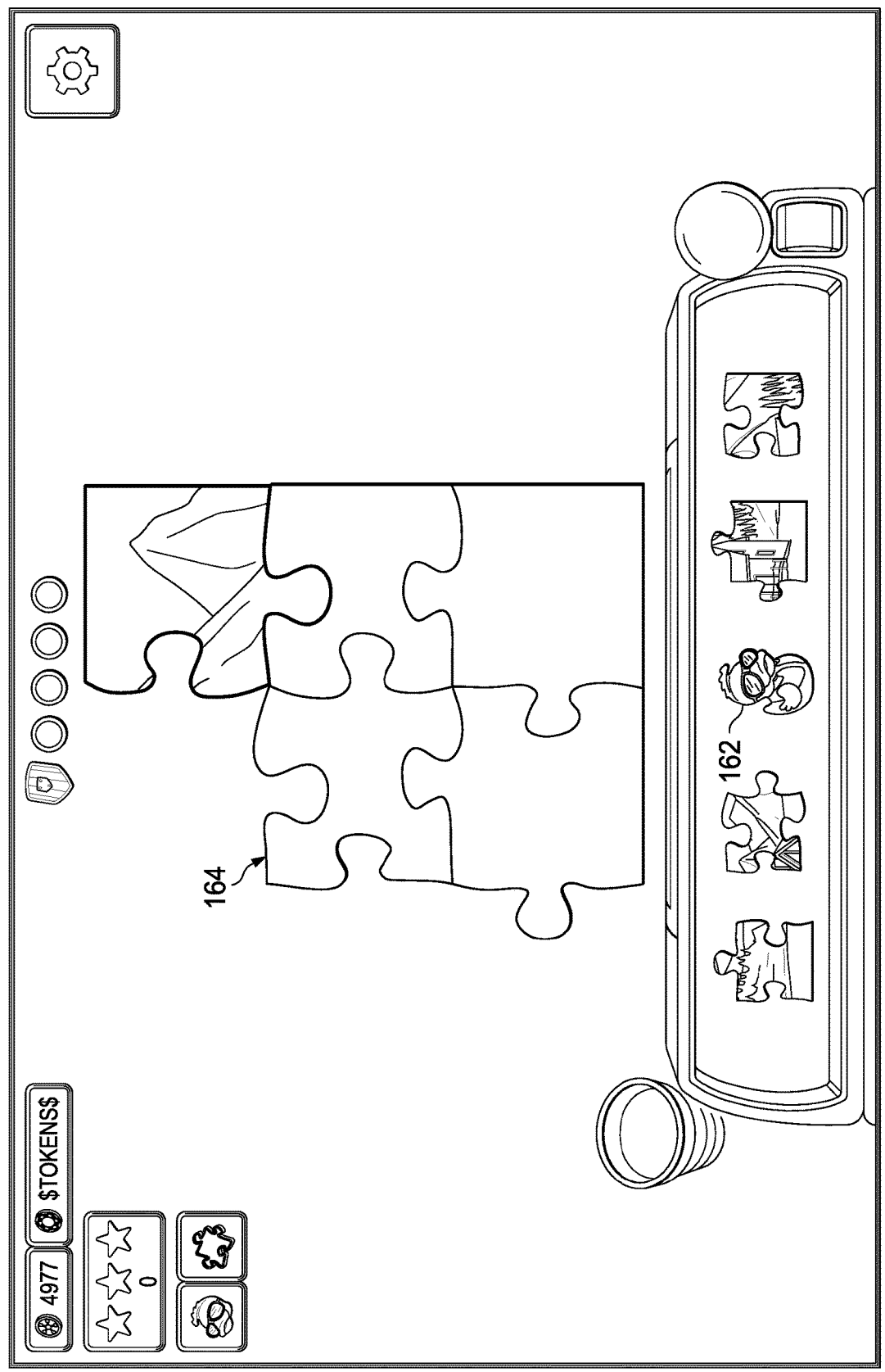

In addition to the standard gameplay described above, the mobile puzzle application may give players the opportunity to use a slot machine to receive bonuses and power-ups. The slot machine can appear at any suitable point during the puzzle solving, including after selecting starting pieces for each chunk. Therefore, if a puzzle is made of three (3) chunks, the player will see the slot machine 3 times after each chunks' starting piece has been selected. The slot machine 150 of FIG. 1K appears after a starting piece 154 is selected. Players may receive one free spin each time the machine appears. Additional spinner tokens 156 may be available, either through in-game achievement, gameplay events, promotional in-game mail, or by in-game purchase. If the player is unhappy with the power-up received (or did not receive if no match was made) after spinning the machine, the additional tokens can be used to spin again. To spin, the lever 152 may be pulled, dragged, tapped, or otherwise activated. The player can win a variety of prizes, ranging from power-ups to in-game currency. In-game currency can be used to purchase additional spinner tokens 156, new puzzles, and other awards and power-ups. Players are awarded a prize (e.g, currency, power-up, etc.) when they match three of a kind in the slot machine 150. The slot machine 150 includes lights 158. Each time the lever is pulled in a particular turn (i.e., between chunks), a portion of a light 158 is filled. Each light 158 may represent a measurement of prize points. A pull with no prize awards may award a small amount of prize points. A pull with a reward awards a larger amount of prize points—better prizes may provide more points. Each pull of the lever partially fills the light 158 based on points being added. In most instances, it may take multiple pulls to completely fill a particular light 158. In one example, pulling the lever with no prize awards 1 point. Pulling and getting a good prize may award 5 points. Light A may require 10 points to be filled and subsequently moving the player to a second tier of prizes. Additional lights may require additional points, such as 20 for the second tier of lights and 30 points for the third tier of lights, etc. As the player fills the lights 158, better and more useful prizes (e.g., relatively better power-ups and higher currency amounts) are added to the slot machine. In some instances, bombs may be included in the possible icons, where those bombs reduce the progress of the lights 158, thereby removing or reducing the current power-up/bonus level of the slot machine. FIG. 1L illustrates two examples of the results of the potential power-ups—(1) a marker (162) indicating the presence of duds in the player's hand and (2) an outline of the current chunk (164). Both power-ups can provide the player with a significant advantage, and can be translated into higher scores by making the solving of the chunk easier for the user, allowing for higher accuracy and quicker times in finishing chunks. Power-ups may last until a particular chunk is completed, or they may alternatively last until the entire puzzle is completed. In other instances, the power-ups may be timed, such that they carry over from chunk to chunk and, in some cases, puzzle to puzzle, until the time associated with the power-up expires.

Figure 2:
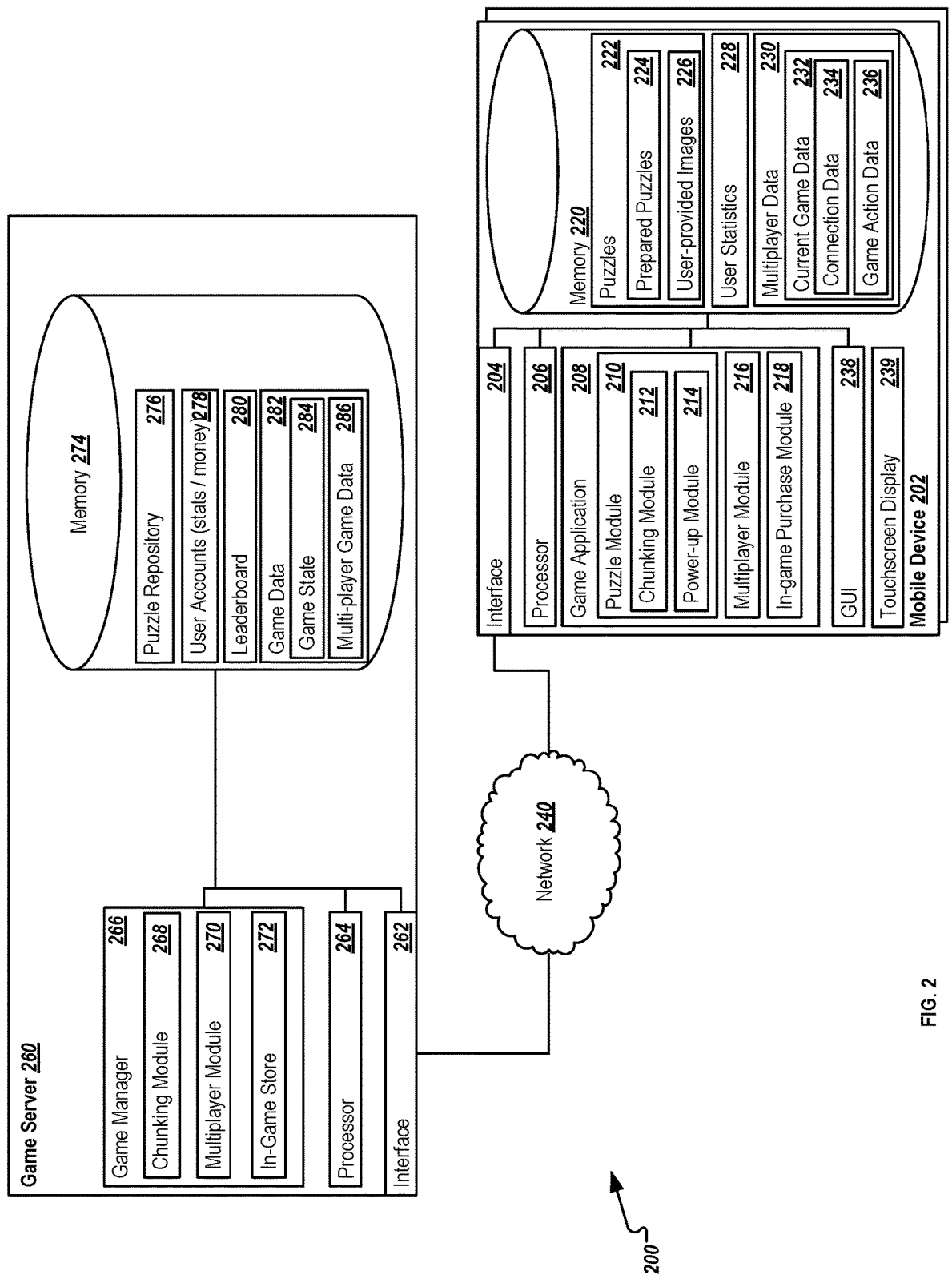
FIG. 2 is a block diagram illustrating an example system for providing and supporting a mobile puzzle game as described herein.

Turning to the illustrated embodiment, FIG. 2 is a block diagram illustrating an example system 200 for providing and supporting a mobile puzzle game as described herein. As illustrated in FIG. 2, system 200 is a client-server and device-client system capable of executing local and remote puzzle applications at mobile devices 202, where the applications allow users, or players, at the devices to enjoy mobile puzzle gaming. The gaming described herein may be played as a single player game or a multiplayer game (e.g., two or more players), with the game application executing locally at the mobile device 202 or executing using a web-based system where a web browser or web-enabled application can interact with a game server 260 to present the puzzle game. Further, the game server 260 may provide back-end support, instructions, and information related to the puzzle gaming, serving, for example, as a source of new and updated puzzle collections (e.g., in puzzle repository 276), as a centralized manager of multiplayer games, and as a location managing in-game purchases.

In general, system 200 includes or is communicably coupled with at least one mobile device 202, and game server 260, where these systems are connected, at least in part, by network 240. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, mobile device 202 and game server 260, among other illustrated components, may be any computer or processing device such as, for example, a blade server, general-purpose personal computer (PC), Mac®, workstation, UNIX-based workstation, smartphone, tablet, laptop, smart watch, or any other suitable device. Moreover, although FIG. 2 illustrates a single game server 260, game server 260 can be implemented using two or more systems, as well as computers other than servers, including a server pool. Further, multiple game servers 260 may be used based on the location of the mobile device 202, player information or preferences, or other suitable determinations. Alternatively, at least some of the functionality of the game server 260 may be available locally at mobile device 202, at network 240 as a cloud-based solution, or in any other suitable location. Further, and as noted above, the game server 260 may remotely execute the game application, allowing the mobile device 202 to connect via network 240 to play the game via a browser or shell. The present disclosure contemplates computers other than general purpose computers, as well as computers without conventional operating systems.

Mobile device 202 may be any computing device operable to execute a game application 208 for generating and solving puzzles. The mobile device 202 may be operable to connect to and/or communicate with game server 260, other mobile devices 202, and other components via network 240, as well as with the network 240 itself, using a wireless or wireline connection. The mobile device 202 can include a smartphone, a tablet, a hybrid laptop/tablet device, a laptop, or any other suitable device. In general, mobile device 202 comprises an electronic computer device operable to receive, transmit, process, and store any appropriate data associated with the game application 208.

As illustrated the mobile device 202 includes an interface 204, a processor 206, a game application 208, memory 220, and a graphical user interface/touchscreen display 238. The interface 204 is used by the mobile device 202 for communicating with other systems in a distributed environment— including within the environment 200—connected to the network 240, e.g., game server 260 or other systems communicably coupled to the network 240. Generally, the interface 204 comprises logic encoded in software and/or hardware in a suitable combination and operable to communicate with the network 240. More specifically, the interface 204 may comprise software supporting one or more communication protocols associated with communications such that the network 240 or interface's hardware is operable to communicate physical signals within and outside of the illustrated environment 200.

Network 240 facilitates wireless or wireline communications between the components of the environment 200 (i.e., between the mobile device 202 and game server 260, between mobile devices 202, or among other combinations of components), as well as with any other local or remote computer, such as additional clients, servers, or other devices communicably coupled to network 240, including those not illustrated in FIG. 2. In the illustrated environment, the network 240 is depicted as a single network, but may be comprised of more than one network without departing from the scope of this disclosure, so long as at least a portion of the network 240 may facilitate communications between senders and recipients. In some instances, one or more of the illustrated components may be included within network 240 as one or more cloud-based services or operations. The network 240 may be all or a portion of an enterprise or secured network, while in another instance, at least a portion of the network 240 may represent a connection to the Internet. In some instances, a portion of the network 240 may be a virtual private network (VPN). Further, all or a portion of the network 240 can comprise either a wireline or wireless link. Example wireless links may include 802.11a/b/g/n/ac, 802.20, WiMax, LTE, and/or any other appropriate wireless link. In other words, the network 240 encompasses any internal or external network, networks, sub-network, or combination thereof operable to facilitate communications between various computing components inside and outside the illustrated environment 100. The network 240 may communicate, for example, Internet Protocol (IP) packets, Frame Relay frames, Asynchronous Transfer Mode (ATM) cells, voice, video, data, and other suitable information between network addresses. The network 240 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 2, the mobile device 202 includes a processor 206. Although illustrated as a single processor 206 in FIG. 2, two or more processors may be used according to particular needs, desires, or particular implementations of the environment 200. Each processor 206 may be a central processing unit (CPU), an application specific integrated circuit (ASIC), a field-programmable gate array (FPGA), or another suitable component. Generally, the processor 206 executes instructions and manipulates data to perform the operations of the game application 208 and any other operations associated with the mobile device 202. Specifically, the processor 206 executes the algorithms and operations described in the illustrated figures, including the operations performing the functionality associated with the mobile device 202 generally, as well as the various software modules (e.g., the game application 208), including the functionality for sending communications to and receiving transmissions from game server 260, and other mobile devices 202.

The illustrated mobile device 202 also includes memory 220, or multiple memories 220. The memory 220 may include any memory or database module and may take the form of volatile or non-volatile memory including, without limitation, magnetic media, optical media, random access memory (RAM), read-only memory (ROM), removable media, or any other suitable local or remote memory component. The memory 220 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the mobile device 202 and its game application 208. Additionally, the memory 220 may store any other appropriate data, such as VPN applications, firmware logs and policies, firewall policies, a security or access log, print or other reporting files, as well as others. For example, memory 220 can store one or more puzzles 222, user statistics 228, and multiplayer data 230 related to the game application. Additional information associated with and used by the mobile device 202 can also be stored in memory 220, but are not described in detail herein.

As illustrated, a local set of puzzles 222 may be stored at the mobile device 202. The puzzles 222 may include one or more prepared puzzles 224 designed by the game's developers or other third parties, where such prepared puzzles 224 are downloaded to or accessed by the mobile device 202 and used during execution of the game application 208. Additionally, one or more user-provided images 226 may be used to generate puzzles for use in the game application 208. For example, the user or player may take a picture with the camera functionality of the mobile device 202, where appropriate, and cause the game application 208 to use those images as the basis for a new puzzle. The user-provided images 226 may be obtained at runtime or from a photo library stored locally at the mobile device 202 or stored remotely.

The user statistics 228 stored in memory 220 may include any suitable user information, including a unique identifier associated with the user or player, gameplay preferences, friend lists and related information, user demographic information, and user ranking information. The user statistics 228 can be used to provide a customized experience for the player, as well as to connect with one or more other players of similar skill levels or in nearby locations.

The multiplayer data 230 includes information on one or more multiplayer games a player may be involved in or previously joined. The multiplayer data 230, along with the multiplayer module 216, can be used to initiate, participate in, and otherwise track multiplayer games. Multiplayer games can be conducted in a local network or remotely via either P2P connections or connections facilitated by the game server 260. The multiplayer data 230 may include current game data 232, which provides information on current multiplayer games in action. Multiplayer games may be played in real-time (i.e., synchronously) or asynchronously, where players play a portion of the game and wait for the other player(s) to play the same parts. As they are completed, scores can be calculated and updated, thereby allowing the players to interact on the same timeline (e.g., for different chunks). In some instances, a first player may complete the entire puzzle before a second player begins the puzzle. The results of the competition therefore are not known until after the second player completes the puzzle. The results of the multiplayer game can then be transmitted to both players. As illustrated, the current game data 232 may include connection data 234, which can describe the type of game (e.g., local, remote, real-time, asynchronous, etc.). The game action data 236 can provide updates on actions taken by either the player associated with the mobile device 202 or the competitors of the player. The game action data 236 can be used to report back results, either complete or partial, as well as provide a replay of the action between the players. In real-time multiplayer games, a split screen may be provided with the first player's moves and results shown in a first portion of the screen while the second player's results are shown in a second portion of the screen. The game action data 236 may be updated in real-time as information from the competitor is received.

As illustrated, the mobile device 202 includes the game application 208. The game application 208 represents an application, set of applications, software, software modules, or combination of software and hardware used to provide the operations and instructions for preparing and solving puzzles for player completion. In the present solution, the game application 208 can perform operations including identifying images for using as a basis for a puzzle, generating puzzle pieces for the puzzle (where necessary), performing a chunking process to separate the puzzle pieces into groups manageable for completion at the mobile device 202, and scoring the results of a player's attempt to complete the puzzle, among others. As illustrated in FIG. 2, the game application 208 includes a puzzle module 210, a chunking module 212, a power-up module 214, a multiplayer module 216, and an in-game purchase module 218. Additional modules and functionality may be included in alternative implementations.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Swift, Java™, Visual Basic, assembler, Perl®, any suitable version of 4GL, as well as others.

The puzzle module 210 performs operations associated with allowing the puzzle to be generated, displayed, solved, and the results scored. The puzzle module 210 can include a chunking module 212 and a power-up module 214. The chunking module 212 allows the game application 208 to be uniquely accessible on mobile devices. Namely, the chunking module 212 allows puzzles to be dynamically divided into a set of mutually exclusive chunks, where the chunks are solved individually to provide an easier and more mobile-centered presentation for solving the puzzle. A detailed description of an example method of puzzle creation is provided in relation to FIG. 6. In short, each puzzle can be divided into a set of pieces, where the number of pieces may be determined by a relative difficulty of the puzzle. Using a chunking algorithm, a determination of how many chunks are to be included in the puzzle is made. Each chunk represents a mutually exclusive set of connected pieces from within the puzzle to be solved individually so that the player can easily and efficiently solve the puzzle on mobile devices of limited display sizes. The chunking module 212 can manage and execute the chunking process based on the various difficulty and screen size factors associated with a particular instance of a puzzle. The power-up module 214 can be used to monitor gameplay and apply one or more power-ups earned or purchased by the player. The various power-ups managed by the power-up module 214 can modify gameplay to provide hints and alternative actions within the puzzle solving process. The power-up module 214 can further manage the attempts to gain power-ups, including functionality associated with a slot machine bonus game described herein.

The multiplayer module 216 performs operations in allowing players to participate in a multiplayer game. In some instances, the multiplayer module 216 can allow the game application 208 to connect directly or indirectly to a game application executed by another mobile device 202. The multiplayer module 216 can manage communications with the corresponding device(s) and allow information related to the game status and player actions to be shared between the game applications 208. As noted, the multiplayer data 230 can provide information to the multiplayer module 216 allowing state and scoring information to be update in real-time or asynchronously. In some instances, the multiplayer module 216 may connect to the game server 260 for multiplayer games, where the game server 260 manages the interactions between the two systems.

The in-game purchase module 218 provides players access to an in-game economy of micro-transactions and enhancements for the player's gaming experience. For example, additional puzzles, functionality, and power-ups may be purchased through the in-game purchase module 218. In some instances, the in-game purchase module 218 can allow additional content to be downloaded to the game application 208 and/or mobile device 202, while in others, the in-game purchase module 218 may allow additional functionality to be unlocked at the mobile device 202.

Graphical user interface (GUI) 238 of the mobile device 202 interfaces with at least a portion of the environment 200 for any suitable purpose, including generating a visual representation of the game application 208. In particular, the GUI 238 may be used to view and interact with a current puzzle being solved within the game application 208. In addition to uses associated with the game application 208, the GUI 238 may be used to view and interact with various Web pages and applications located locally to the mobile device 202, external from the mobile device 202 but within illustrated environment 200, or externally from environment 200. Generally, the GUI 238 provides the player with an efficient and user-friendly presentation of the puzzle being solved, including opportunities to solve the puzzle via individual chunks. The GUI 238 may comprise a plurality of customizable frames or views having interactive fields, pull-down lists, and buttons operated by the player. For example, the GUI 238 may provide interactive elements that allow a user to view or interact with information related to the operations of the process associated with the game application 208 and specifically, puzzles being solved. GUI 238 contemplates any suitable graphical user interface that processes information in the platform and efficiently presents the results to the user visually. In particular, the GUI 238 can be presented on a touchscreen or touch-capable display 239. While the GUI 238 is presented via the display 239, player inputs can be received via the same touchscreen and used to interact with the game application 208 and any other operations of the mobile device 202.

As illustrated in FIG. 2, two or more mobile devices 202 may be present in environment 200. In some instances, one or more of the mobile devices 202 may not have the game application 208 installed on the mobile device 202, instead remotely accessing at least a portion of the game application functionality stored remotely (e.g., at the game server 260, in a cloud-based application executed in network 240, or any other suitable location). In those instances, the operations associated with the game application 208 can be executed at least in part remote from the mobile device 202, wherein the presentation and GUI 238 related to the game application 208 are presented in a web browser or app-based shell view.

Game server 260 is a server or system used to assist in the management and distribution of one or more puzzles for use in game application 208. Additionally, game server 260 provides support for multiplayer games played across devices and offers in-game stores for player purchases of additional functionality, puzzles, and power-ups. In some instances, game server 260 may host or execute one or more game applications 208, with mobile devices 202 and other clients presenting the hosted games remotely.

As illustrated, the game server 260 includes an interface 262, a processor 264, a game manager 266, and memory 274. In general, the game server 260 is a simplified representation of one or more systems and/or servers that provide the described functionality, and is not meant to be limiting, but rather an example of the systems possible. The interface 262 and processor 264 may be similar to or different than the interface 204 and processor 206 described for mobile device 202. In general, interface 262 comprises logic encoded in software and/or hardware in a suitable combination and operable to communicate with the network 240. Processor 264 executes instructions and manipulates data to perform the operations of the game server 260. Specifically, the processor 264 executes the algorithms and operations described in the illustrated figures, including the operations performing the functionality associated with the game manager 266.

The game manager 266 performs a number of game application-related actions. In some instances, the game manager 266 may perform at least a portion of the chunking operations via chunking module 268. When the game manager 266 manages the entire execution of a game application 208, the chunking module 268 may perform all chunking operations, while the game manager 266 performs a similar role as the game application 208 described in the mobile device 202. The game manager 266 can provide a multiplayer module 270 for managing connections and interactions between players and their devices during multiplayer competitions. Still further, the game manager 266 can include an in-game store module 272, where the module 272 acts as an entry point and payment system for processing in-game purchases, including new puzzles from puzzle repository 276.

Game server 260 also includes memory 274, which may be similar or different to memory 220. Memory 274 as illustrated includes the puzzle repository 276, user account information 278, a player leaderboard 280, and a set of game data 282. The puzzle repository 276 can store one or more available puzzles for solving within the game application 208. The puzzles within the puzzle repository 276 may be free or they may be purchased via the in-game store 272. In some instances, players may submit their own images to the game server 260 to be used as puzzles for distribution via the puzzle repository 276. The user account information 278 can store relevant information associated with players and their devices 202, including unique identifiers associated with the players, payment information associated with the players for purchases to be made, statistics for players based on prior puzzle attempts and successes, as well as multiplayer game records and rankings. The user account information 278 may also include available spending amounts and in-game earnings associated with the accounts that can be used in the in-game store 272 to purchase additional content, functionality, and power-ups.

The leaderboard 280 may provide a listing of relative rankings of all players, or may dynamically filter rankings by related players (e.g., friends, social network connections, previous opponents, etc.), and may be viewed from within the game application 208. The set of game data 282 may be used to manage a plurality of games or competitions, such as those competitions being played remotely on the game server 260. In such instances, the game state information 284 may be used to store state information for remotely executed games. Additionally, multiplayer game data 286 may be used to manage ongoing multiplayer competitions. The data 286 may include information on one or more asynchronously played multiplayer games, where players solve the same puzzle at different times. The stored multiplayer game data 286 can be used to compare the performance of the second player against the earlier results of the first player once the second player completes the puzzle. Additionally, intermediate actions of players in a multiplayer game can be compared to determine intermediate scoring, including the first to place particular pieces in a chunk, the first to complete particular chunks, and the first to place particular chunks in a puzzle frame, among others.

While portions of the elements illustrated in FIG. 2 are shown as individual modules that implement the various features and functionality through various objects, methods, or other processes, the software may instead include a number of sub-modules, services, components, libraries, and such, as appropriate, one or more performed remotely from the illustrated elements. Conversely, the features and functionality of various components can be combined into single components as appropriate.

Figure 3A:
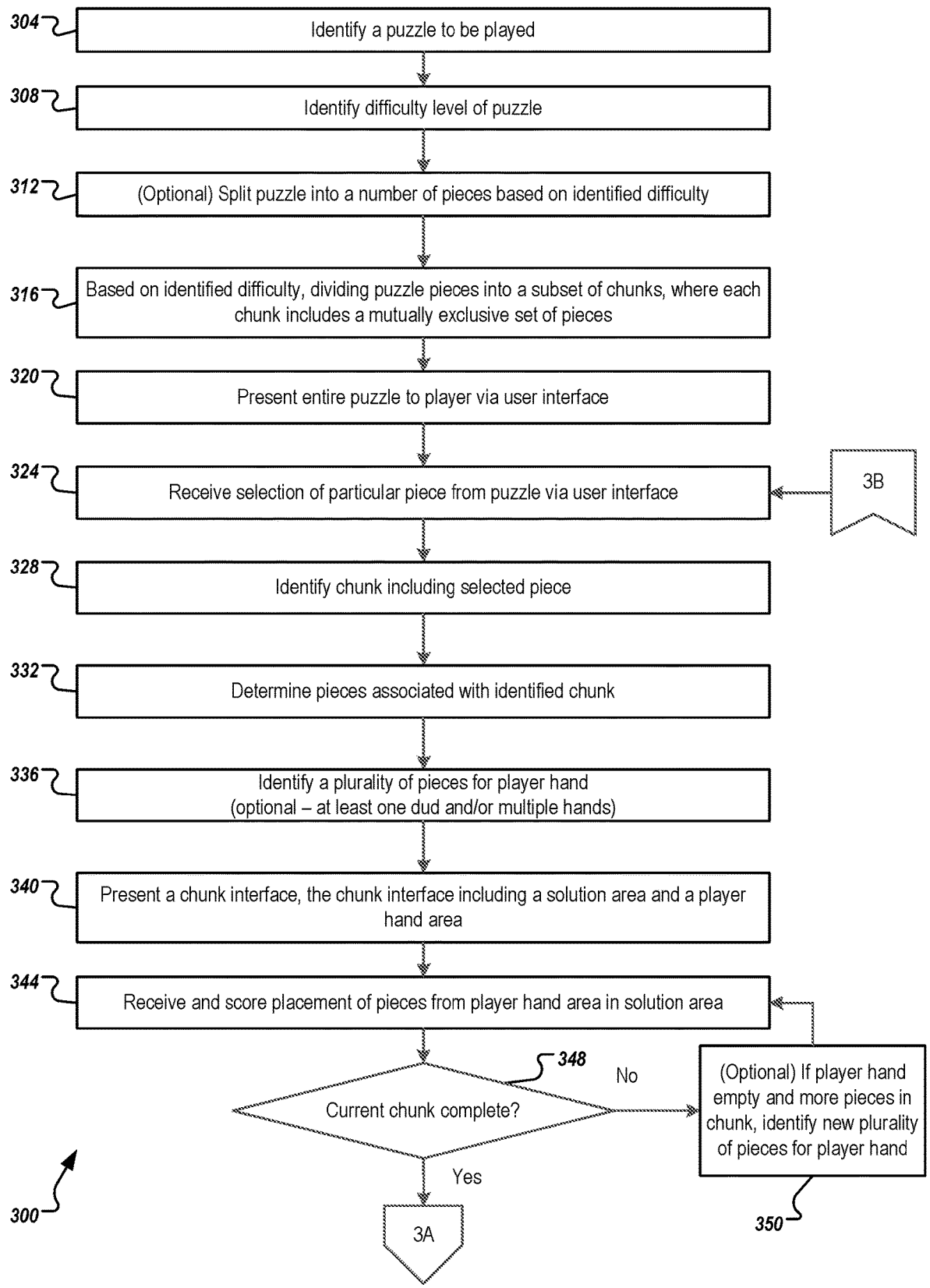
FIGS. 3A-B are illustrations of example operations for providing the mobile puzzle game and interacting with players.
Figure 3B:
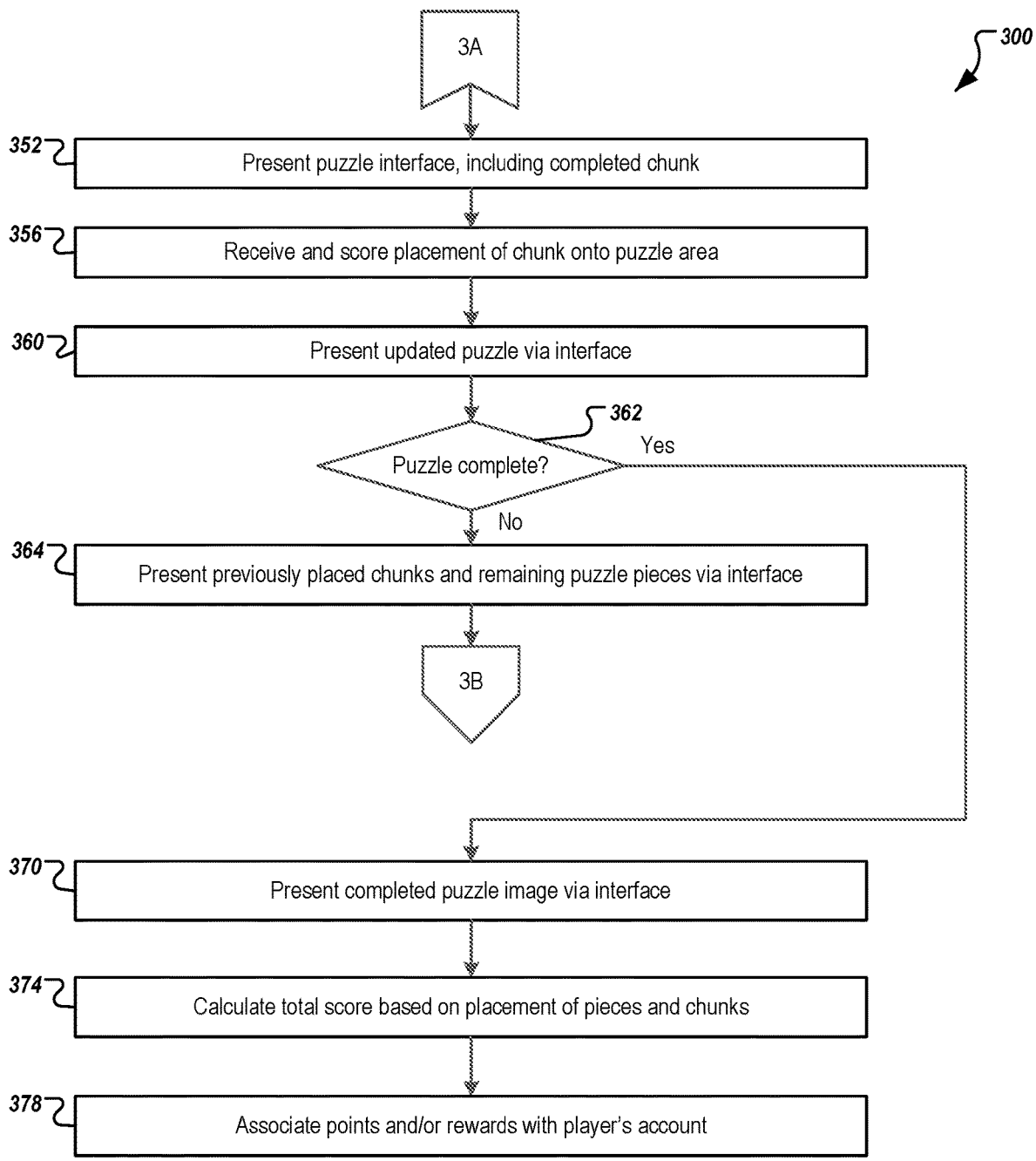

FIG. 3A-B are illustrations of example operations for providing the mobile puzzle game and interacting with players. For clarity of presentation, the description that follows generally describes method 300 in the context of the system 200 illustrated in FIG. 2. However, it will be understood that method 300 may be performed, for example, by any other suitable system, environment, software, and hardware, or a combination of systems, environments, software, and hardware as appropriate. In the described method 300, the operations may be performed at a particular mobile device 202, the game server 260, or any other suitable location.

At 304, a puzzle to be played is identified. The puzzle may be identified based on a player selection within a game application. In some instances, a set of thumbnails representing available puzzle images may be provided and a new puzzle selected from those options. In some instances, the player may submit his or her own image or picture to be used for the puzzle to be played. At 308, a difficulty level for the puzzle is identified. In some instances, the difficulty level may be based, at least in part, on the number of pieces to be provided in the puzzle. In addition to the number of pieces, the difficulty level may be based on a skill level of the player (either as provided by a manual selection from the player or by an automatic determination by the game application), where the skill level determines a number of "dud" pieces to be included during gameplay, as well as the number and/or sizes of chunks for the puzzle to be separated into.

At 312, if the puzzle is not already split into individual pieces corresponding to the size of the puzzle (e.g., where the image for puzzle is provided by the player, where the puzzle has not previously been split into the requested number of pieces, etc.), the puzzle may be separated into the correct number of pieces. Any suitable algorithm for splitting the puzzle into multiple pieces may be used.

Figure 6:
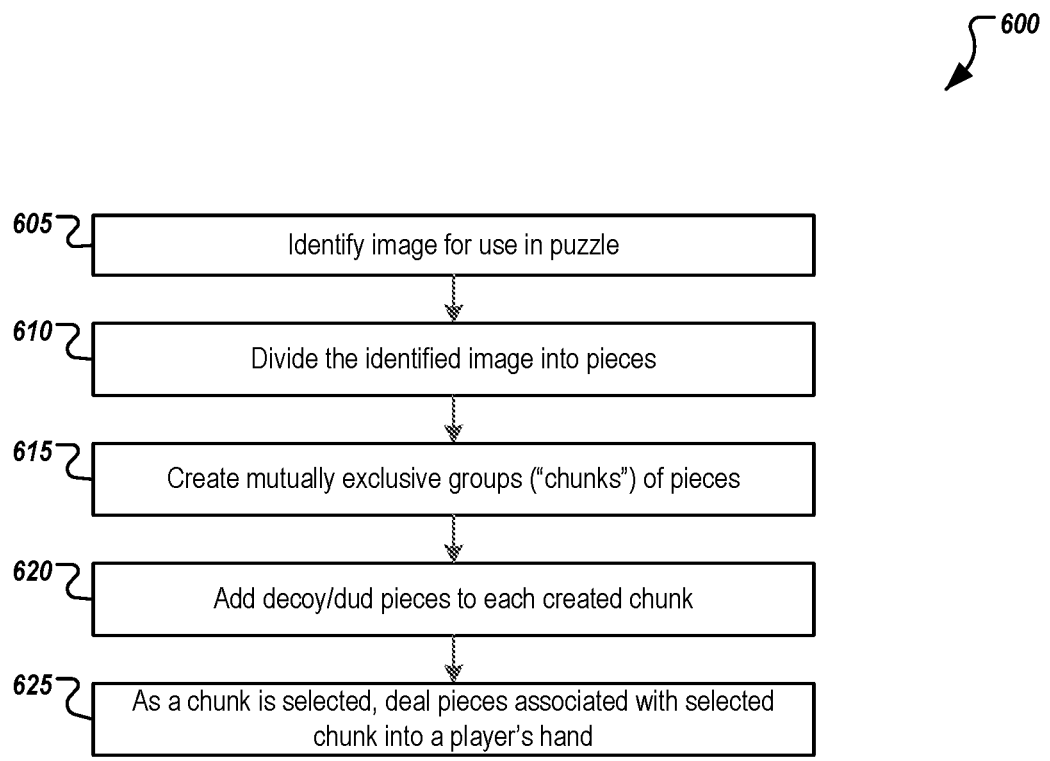
FIG. 6 is an illustration of example operations for creating puzzles, their set of chunks, and the particular player hands in one implementation.

At 316, the puzzle pieces of the puzzle are divided into a subset of chunks, where each chunk includes a mutually exclusive set of pieces from the puzzle, and where the chunks, when combined, form the entirety of the puzzle. Each chunk contains a set of interconnected pieces, with those interconnected pieces belonging only to a single chunk. As will be described further, chunks are solved individually before being placed into the larger puzzle as a whole. FIG. 6 provides a description of an example chunking algorithm, although others may be used instead.

At 320, after generating the chunks, a view of the entire puzzle is presented to the player via a user interface, with the puzzle being illustrated as a set of connected pieces (see, for example, the illustration of FIG. 1A). The player will further be prompted to select a starting piece to initiate solving the puzzle. At 324, the game receives the selection of a particular piece of the puzzle as the starting piece. In most instances, the input received from the player will be received from a touch-based input via the user interface of a mobile device on which the game application is executing.

In response to receiving the selected starting piece, method 300 continues at 328, where a chunk including the selected piece is identified. As previously described, each piece is associated with one and only one chunk. At 332, the other pieces associated with the identified chunk are determined. In some instances, pieces associated with a particular chunk may be associated with a common identifier, field, or other indicator linking those pieces to the particular chunk.

Once the pieces associated with the particular chunk are identified, the pieces are placed into "hands", or a groupings of pieces, to be used in solving the chunk. In some instances, a hand may include five pieces, although any other number of pieces may be appropriate. In some instances, hand sizes may be based on the available display area on the mobile device. In others, hand size may be based on a difficulty level associated with the current puzzle. In some instances, hands may include one or more dud pieces, or randomly generated pieces that do not fit within the chunk. Dud pieces may include a portion of the puzzle image associated with the current chunk, but are designed so that the dud piece does not fit with the other pieces in the chunk. In other instances, dud pieces may be mirror images of pieces that may be included in the chunk, but that do not fit with the other pieces in the chunk. Still further, the dud pieces may be associated with a part of the puzzle image that is not included in the chunk, and therefore should not be connected to any of the pieces in the chunk. In general, the dud pieces may be any piece that does not connect to or otherwise belong within the chunk. In some instances, the number of pieces (and any duds) associated with a particular chunk will be more than can fit in a single hand. In those instances, multiple hands may need to be dealt to the player as previous hands are completed or, alternatively, when individual pieces are placed into the chunk (or discarded in the case of chunks).

At 340, a chunk interface is presented via the user interface. The chunk interface is a screen or interface used to solve a particular chunk, and can include a solution area and a player hand area. The current hand of pieces is presented in the player hand area, while the initially selected piece (and any other placed pieces) are presented in the solution area. While solving the puzzle, the player can drag-and-drop or otherwise place the pieces into the solution area. At 344, the placement of particular pieces from the player hand area to the solution area are received and scored. Example methods of scoring particular piece placements are described in FIG. 4. As pieces are placed, method 300 continues to 348 to determine whether the current chunk is complete and solved. If determined to be unsolved, method 300 moves to optional operation 350, where, if the player hand is empty and more pieces remain in the chunk, a new set of pieces are added to and presented in the player hand. If the player hand still has pieces, method 300 can skip 350 and return directly to 344. Returning to 344, additional piece placements are received and scored with the process continuing until the chunk is complete and solved.

When, at 348, the chunk is determined to be solved, method 300 continues at 352. When a chunk is complete, the game application can present a puzzle interface for placing the completed chunk within the context of the whole puzzle. If it is the first chunk completed, the chunk may be placed within the empty puzzle frame. If previous-solved chunks have been placed within the puzzle frame before, then those chunks will be present when the puzzle interface is presented to the player. Similar to chunk solving above, the placement of the chunk to the puzzle interface is received and scored at 356. Example methods of scoring particular piece placements are described in FIG. 5. Upon placement of the chunk, the updated puzzle is presented in the puzzle frame of the puzzle interface at 360.

At 362, a determination is made as to whether the puzzle is complete—that is, whether additional chunks are to be solved or if all chunks have been solved and placed. If the puzzle is not complete then method 300 continues at 364, where the puzzle interface presents the previously-placed chunks within the puzzle frame, along with an outline of the remaining pieces to be solved and a prompt to have the player select a new starting piece for the next chunk to be solved. Method 300 then returns to 324, where the selection of the particular piece is received and the chunk is subsequently solved. If the puzzle is determined to be complete, method 300 moves to 370.

At 370, the completed puzzle image is presented in the puzzle frame of the puzzle interface. Additionally, the combined total score of the individual piece and chunk placements are calculated at 374, and can be presented to the player. The scores may be continuously updated through the game as pieces and chunks are placed. In those instances, the total score and any corresponding rewards associated with the score (e.g., stars, credits, semantic ratings such as "excellent," "perfect," "high score", etc.) may be presented then. Once the total is calculated, the points and rewards earned during the gameplay can be associated with the player's account at 378.

Figure 4:
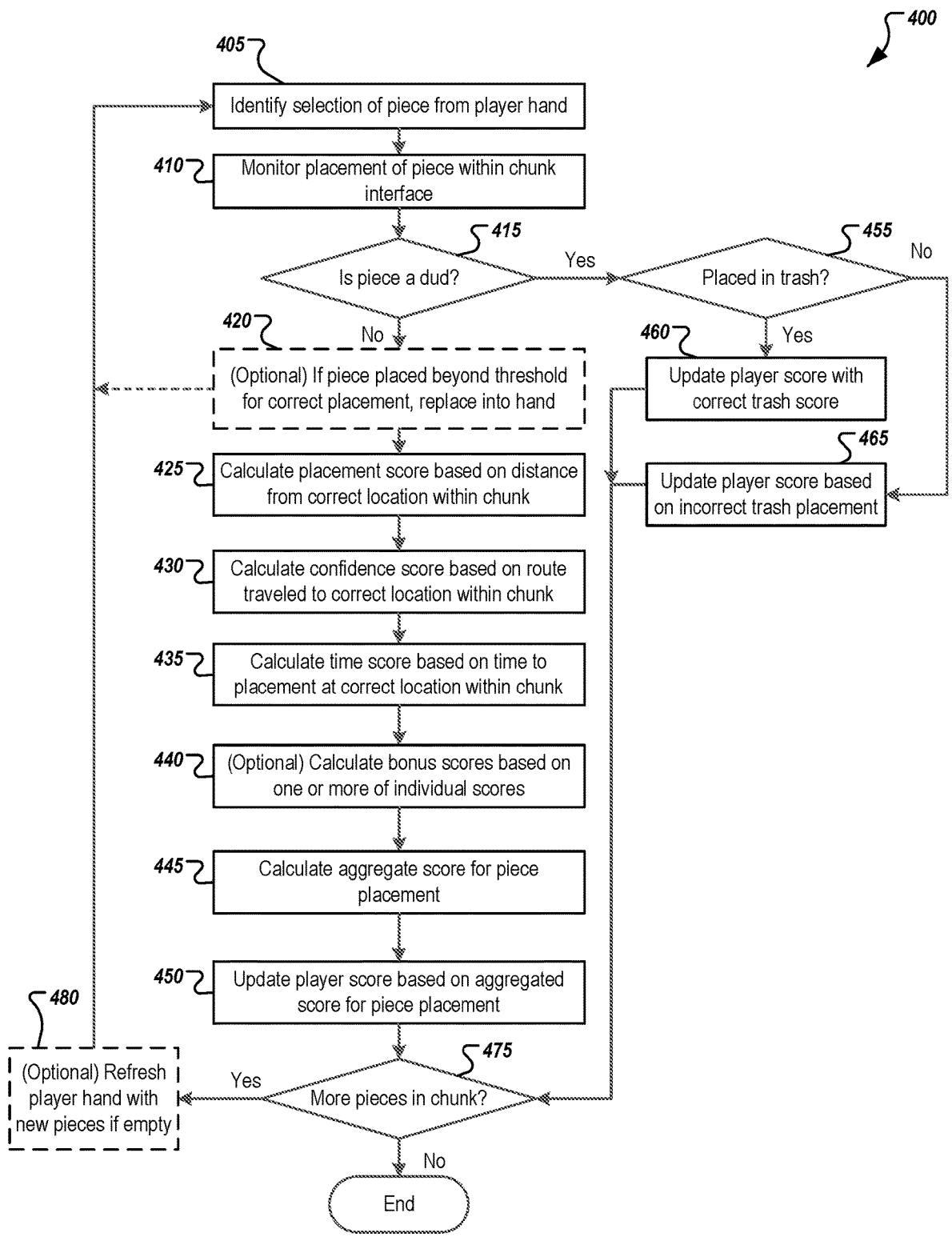
FIG. 4 is an illustration of example operations for providing scoring associated with player placements of pieces associated with a particular chunk.

FIG. 4 is an illustration of example operations for providing scoring associated with player placements of pieces associated with a particular chunk. For clarity of presentation, the description that follows generally describes method 400 in the context of the system 200 illustrated in FIG. 2. However, it will be understood that method 400 may be performed, for example, by any other suitable system, environment, software, and hardware, or a combination of systems, environments, software, and hardware as appropriate. In the described method 400, the operations may be performed at a particular mobile device 202, the game server 260, or any other suitable location.

Method 400 begins after players have been dealt a hand of pieces associated with the chunk currently being solved, and after at least a starting piece has been presented in a chunk interface. As described, the hand may be a group of 5 pieces (or any other number of pieces), where at least some of the pieces are included within the chunk being solved. In some instances, one or more of the pieces in a hand may be duds, or pieces that do not fit or otherwise belong within the chunk.

At 405, the selection of a piece from the player's hand is identified. As each piece either belongs at a certain location within the chunk, the location where a particular piece from the hand goes is known. In some instances, that location is within the chunk being solved, while if the piece is a dud, that location may be in a trash or discard pile or location. At 410, the placement of the piece within the chunk interface is monitored and followed by the game application.

At 415, a determination is made as to whether the piece being placed is a dud or not. If so, method 400 moves to 455, where a determination is made as to whether the dud is placed into a trash or discard area. If so, the player is awarded points for the correct placement in the trash, and that piece is discarded from the player's hand at 460. Method 400 would then continue to 475. If, however, the dud was placed within the solution area of the chunk interface in an attempt to place the piece within the chunk, at 465, an indication of an incorrect placement is provided and the player's score is updated on the incorrect action. The piece may be removed from the game application and indicated that the piece should have been placed into the trash or discard area. Method 400 then continues at 475.

Returning to the determination of 415, upon a determination that the piece being placed is not a dud, then the placement is again monitored as described at 410. If the piece is placed move than a threshold distance away from the correct location, the piece may optionally be placed back into the player's hand at 420, necessitating another attempted placement of the piece. Alternatively, the piece, even though outside of the threshold distance, may be placed in the correct location. Similarly, when the piece is placed within the threshold distance from the correct location, the piece may be presented in the chunk interface in the correct location to allow for future pieces to be placed. Each such placements, along with other facts, may determine the score awarded to the player.

The blocks of 425, 430, 435, and 440 each describe a possible type of scoring to be performed in response to placement of a piece within the chunk interface. Different implementations and player preferences or game type may determine whether some, all, or none of the scoring types (or others not described here) are used. At 425, a placement score is calculated, where the placement score is calculated based on a distance (relative or absolute) from the correct location within the chunk. The placement score may be considered an accuracy-based score, and can include a number of distance thresholds, each providing a different scoring level for the placement of the piece. For example, within the closest threshold, a score of "bullseye" may be achieved representing the highest possible placement score. Expanding thresholds of placement may result in descending scores until the placed piece is outside the last final threshold, where the piece is considered erroneously placed. While the terms "bullseye," "great," "good," and others are used herein, alternative scoring names and indications may be used. For example, a score number value may be used instead of a word, such as "10" instead of "bullseye". Alternatively, the word "perfect" may be used instead of "bullseye" in other instances.

At 430, a confidence score is calculated based on the monitored path taken to place the piece. The confidence score may be based on a line of touch-based movement from the player's hand to the location where the piece is placed. The confidence score may provide a score enhancement when the piece is placed without the player moving the piece from possible location to possible location. In some instances, the confidence score may only be awarded when the location is within a particular placement threshold from the correct location (e.g., one of the first two thresholds).

At 435, a time score may be calculated based on the time to place the selected piece. In some instances, the time may be calculated from the previous piece's placement, while in others, the time may be calculated from the moment the piece is initially selected by the player's touch. Again, the score may be limited to instances where the selected piece is placed within a particular placement threshold from the correct location.

At 440, additional bonus scores not described above may be calculated based on one or more individual scores or based on parameters associated with a particular placement. For example, if a selected piece is placed in the correct location within the chunk, but where that correct location does not connect directly to an already placed piece (e.g., as a free-floating piece), an additional bonus may be provided. In some instances, the distance from the closest piece to the placed piece may determine the size of the bonus. Further, additional bonus points or scores may be applied based on consecutive correct actions (e.g., placements or discards). A score multiplier similar to that illustrated in FIG. 1B (i.e., score multiplier 124) may be used to reward the player as continued success is found. Failures may reduce or empty the multiplier, removing any future bonuses until the player makes two or more consecutive correct actions.

While not illustrated in FIG. 4, additional scoring opportunities may be available in multiplayer games. Specifically, the player's performance for each piece, as well as each chunk, may be evaluated against the competing player. When the player performs better than the competing player, the player may be provided an additional bonus. For example, a "first to place a piece" bonus may be awarded where the player is the first to place a particular piece in the chunk, as well as a "first to complete a chunk" bonus. Similar bonuses may be available for the first to place a chunk, as well as the first to complete the puzzle based on the total time taken for each individual chunk and the chunks' respective placements.

Returning to FIG. 4, once the various scores for a piece's placement are calculated, those scores can be aggregated at 445. The amount of the aggregated score can then be used to update the player's score at 450.

At 475, a determination is made as to whether additional pieces remain to be placed into the chunk. If so, method 400 returns to 405. In some optional instances, at 480 the player's hand may be refreshed where the player's hand is empty but additional pieces remain before completing the chunk. If no further pieces remain in the chunk, method 400 ends, with the updated player score representing the score after the current chunk's completion.

Figure 5:
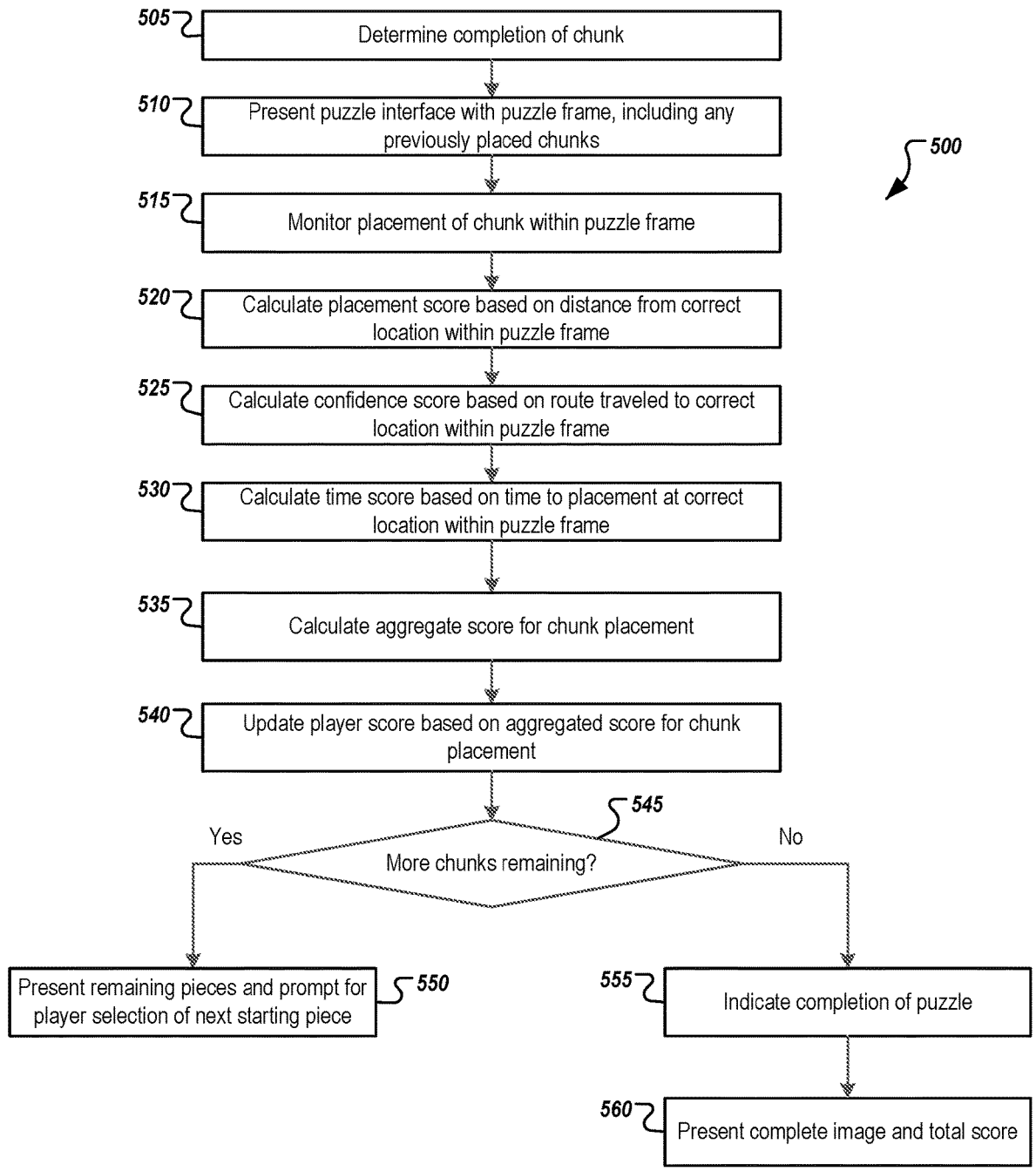
FIG. 5 is an illustration of example operations for providing scoring associated with player placements of completed chunks within the puzzle.

FIG. 5 is an illustration of example operations for providing scoring associated with player placements of completed chunks within the puzzle. As described above, once a chunk is completed the player is given the opportunity to place the completed chunk within the puzzle frame as a whole. Method 500 describes an example scoring methodology based on the placement of the chunk therein. For clarity of presentation, the description that follows generally describes method 500 in the context of the system 200 illustrated in FIG. 2. However, it will be understood that method 500 may be performed, for example, by any other suitable system, environment, software, and hardware, or a combination of systems, environments, software, and hardware as appropriate. In the described method 500, the operations may be performed at a particular mobile device 202, the game server 260, or any other suitable location.

At 505, the completion of a particular chunk in the chunk interface is determined. At 510, the puzzle interface is presented with the puzzle frame included therein. Additionally, any previously placed chunks are placed within the puzzle frame in their proper locations. At 515, the placement of the chunk within the puzzle frame is monitored, which may be similar to the monitoring operations of 410 related to the placement of pieces within the chunk interface.

At 520, a placement score is calculated, where the placement score is calculated based on a distance (relative or absolute) from where the chunk is placed to the correct location within the puzzle frame. The placement score, as with the placement score for the pieces within the chunk, may be considered an accuracy-based score. A number of distance thresholds may be predefined for the chunks, each threshold providing a different scoring level when the chunk is placed at that distance or distance range. The placement score for the chunk placement may be calculated in a similar manner to the piece placements, with descending scores reflecting larger distances from the correct placement location.

At 525, a confidence score may be calculated based on the route traveled from the original location of the chunk in the puzzle interface to the placed location in the puzzle frame. Again, the confidence score for the chunk placement may be similar to or different from the confidence score for the piece placement described in 430, where a b-line of movement of the chunk to the placement location is evaluated and scored. At 530, a time score based on the time to place the chunk at the correct location within the puzzle frame may be calculated. The time score for the chunk placement may be similar to or different from the time score for the piece placement described at 435. At 535, an aggregated score for the chunk's placement is calculated, combining the various scores into an aggregated value. At 540, the player's score is updated based on the aggregated value.

At 545, a determination is made whether additional chunks remain to be solved and placed. If additional chunks remain, method 500 continues at 550, where the puzzle interface is updated with a presentation of the previously solved chunks and a presentation of the remaining pieces to be completed or solved. The player is also prompted to select the next starting piece, allowing a touch-based selection of one of the remaining pieces. The interaction can then return to the piece placement operations described in part in FIG. 3A-3B.

If, however, no additional chunks remain to be placed, method 500 continues at 555, where an indication of puzzle completion is presented. At 560, the complete image of the completed puzzle can be presented, along with a representation of the total score for the puzzle. If the player is competing in a multiplayer game, the comparative results may be provided once the second player finishes the puzzle. If the player is competing in an asynchronous match and is the first player to attempt the puzzle, the comparative results may not be available for some time. Once the second player completes the puzzle, the results may be provided as a notification or other communication, allowing the player to return to the completed puzzle presentation for a view of the comparative results.

FIG. 6 is an illustration of example operations for creating puzzles, their set of chunks, and the particular player hands in one implementation. FIG. 6 describes a method 600 for creating the puzzles described in this disclosure, including moving from the division of the puzzle itself into pieces, creating the groups of pieces dividing into separate chunks described herein, adding duds or decoy pieces into the groups of pieces, and dealing the pieces into individual hands.

At 605, an image is identified for use in a puzzle. The image may be provided by the developer as a pre-planned puzzle, or the image may be provided by a player/user. Once the image is identified, the image, now considered a puzzle, is divided into pieces at 610. To divide the puzzle, a modular division logic can be used to calculate the "cutting" of the puzzle and the shape of the resultant pieces. Multiple division logics can be defined and swapped between at runtime based on gameplay settings to create a variety of puzzle shapes.

A simple example of a division logic uses a series of splines—whose shape are randomized within the bounds of input parameters, arranged in a rectilinear grid, for which the count and spacing of grid lines are determined by input parameters—to cut the puzzle geometry into pieces. Where each piece should have a connecting edge to another piece, additional splines are added, randomized within the bounds of input parameters, to cut a protrusion from one piece into the other, to form the traditional interlocking puzzle shape. Each piece stores a list of other piece it has a connection created to.

The geometry of the puzzle is divided along the cutting splines into smaller pieces, with vertices added along the cutting edge, at intervals defined by the input parameters. The vertices for each piece are created in-place, at their current coordinates, offset from the puzzle origin. The resultant geometry for each piece is stored as a child of a new object node, where the local position of the piece geometry is set to its negated position relative to the puzzle origin, such that the piece geometry is centered beneath that piece's new object node. This allows the negated local position of the piece geometry to be used as a reference position to detect if the piece is in the right spot relative to the puzzle origin, or relative to any other piece.

Once the puzzle is divided into pieces, a set of mutually exclusive groups of pieces are created at 615. These mutually exclusive groups, as previously referred to, are called chunks. The pieces of the puzzle are arranged into groups of interconnecting pieces using two input parameters—number of groups and group variance. The average group size is calculated by dividing the total number of pieces by the desired number of groups, with the minimum and maximum allowable group sizes calculated by subtracting and adding the specified group variance. As each group is created, its desired size is randomized between the minimum and maximum allowed sizes, and then adjusted upward or downward to ensure that the average piece count for the remaining groups remains within the minimum and maximum sizes.

Creation of the first group starts from the piece with the fewest connections to other pieces and expands outward until the desired group size is fulfilled. As each piece is added to the group, its list of connecting pieces is added to a group-specific list of potential group candidates, ignoring those which have already been considered. A piece is randomly selected from the candidates list and considered for inclusion in the group. A depth-first search is performed on each piece connected to the candidate piece which is not already in the group, to determine the count of all pieces recursively connected to that piece, with each piece tracked so that it is visited only once during this step. This collection of pieces connected to the candidate piece is then evaluated by these rules:

1. If the collection of pieces is smaller than the remaining count of pieces desired for this group, all pieces within it are marked for adoption into the group, and the remaining count is temporarily reduced until a final decision is made.
2. If the collection is larger than the remaining count of pieces desired for this group, it is assumed to represent the remainder of the puzzle.
   a. If this is the second collection and is found to be larger than the remaining count, then adopting the candidate piece into the group would sub-divide the remainder of the puzzle into multiple disconnected sections, which may not be appropriately sized to be groups, so the candidate piece must be rejected, along with all pieces connected to it currently marked for adoption.
3. If all pieces connected to the candidate piece have been considered, and fewer than two collections larger than the remaining count of pieces desired for the group have been found, the candidate is acceptable, and all pieces marked for adoption are added to the group.

Figure 7:
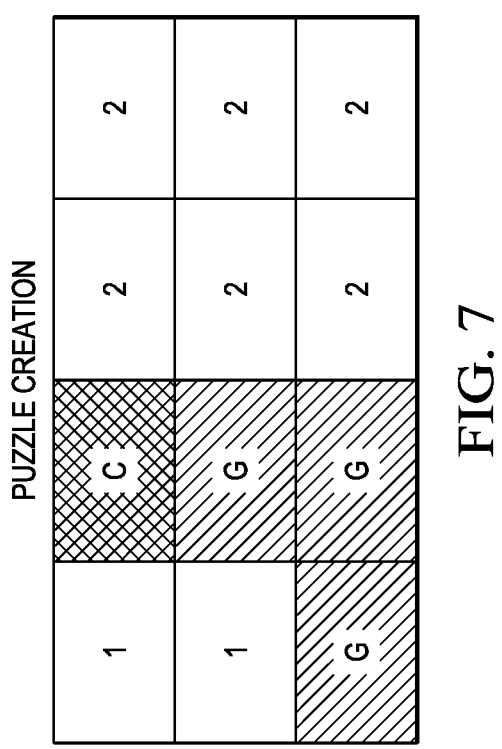
FIG. 7 is an illustration of an example set of pieces during the chunking process.

FIG. 7 provides an example set of pieces during the chunking process. Consider the candidate piece C for inclusion in group where the acceptable range of group size is 5-7 pieces. If the desired group size for G is 5, then C cannot be included in the group, as doing so would create two disconnected sections of pieces which would not form acceptable groups on their own. If the desired group size for G is 6, then C can be included in the group, so long as the pieces marked 1 are also included.

As each piece is added to the group, any pieces connecting to it which are not yet assigned to a group are added to a list of potential group starters. Once the group fulfills its desired count, the group-specific candidate list is reset, and a piece is selected at random from the potential group starters to begin the next group.

In a case where the input parameters do not allow for an even division of the pieces into groups (e.g., 16 pieces, with a group size of 5 and a variance of 0), any remaining pieces are randomly assigned to an adjacent group which is below the maximum group size. If no adjacent group is below the maximum size, the piece is added to the smallest adjacent group (allowing groups which exceed the maximum group size).

Returning to FIG. 6, at 620, once the groups, or chunks, have been created, one or more dud pieces are added to each created chunk. As described, the dud pieces are pieces mixed into the pieces included in a particular chunk which do not belong within the chunk. Two parameters can control the addition of duds and the dealing of pieces into sets: the size of the set and the ratio of dud-to-valid pieces. As previously noted, the ratio of dud-to-valid pieces can be determined based on a difficulty level associated with the gameplay.

To prevent duds from in any way appearing to actually connect upon close inspection, while still appearing to be a part of the puzzle at first glance, the following steps are taken to create a list of potential duds:

1. The potential dud list begins filled with all pieces of the puzzle.
2. All pieces in the current group are removed to avoid duplicating valid piece shapes.
3. All pieces directly connected to each piece in the group are removed, to avoid pieces that shape-wise look like they should connect to a valid piece.
4. A texture transform is applied to the texture of the dud pieces, such as mirroring or slightly offsetting the texture along an axis, so that image-wise the pieces do not match valid pieces on close inspection.

The count of duds to add can be rounded so that the total count of valid pieces and duds is evenly divisible by the set size. To ensure this, the count of sets is determined by dividing the count of pieces in the group (excluding the anchor piece) by the desired ratio of valid pieces, then dividing that by the set size and rounding to the nearest whole number large enough to contain all valid pieces. This count of sets is then multiplied by the set size, and the dud count is found by subtracting the valid piece count from this number.

Duds can be selected at random from the potential dud list until the desired number of duds is filled. Duplicate duds are excluded until all potential dud pieces have been used, then duplicates are allowed to fill out the remaining count.

Additional and alternative methods of generating duds can also be used in various implementations.

At 625, in response to a particular chunk being selected for solving, the pieces associated with the selected chunk are dealt into a player's hand. In order to ensure that the group of pieces can be assembled in the order the pieces are dealt, with each piece in a set having a direct connection to at least one other piece currently visible, the order the pieces are dealt in must be determined in advance.

One piece in each group is chosen as the "anchor" or "starting" piece, from which assembly begins. Each piece connecting to the anchor piece within the same group is added to a list of potential pieces to draw next. One of these pieces is drawn at random, and then all pieces connecting to the drawn piece within the same group are added to the potential piece list, excluding duplicates. This is repeated until all pieces in the group have been drawn. Once all valid pieces have been drawn, each dud piece is randomly inserted into the draw order. Finally, each set of pieces is randomly shuffled so that the pieces of the set are not presented to the player in any predictable order (ex, left-to-right in order of connection). As the player uses the pieces to complete the current chunk, and where more than a single hand is needed to complete the chunk, the hand can be replenished once the pieces previously in the hand have all been used in the chunk or discarded. The next pieces in the current draw order can then be provided to the player's hand as additional puzzle solving occurs.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method executed by one or more processors for providing a puzzle game, the method comprising:
   identifying a puzzle for use in a jigsaw puzzle application, the puzzle comprising a set of puzzle pieces which combine to form a complete puzzle image, each of the puzzle pieces illustrating a portion of the complete puzzle image;
   dividing the identified puzzle into a plurality of chunks, each chunk of the plurality of chunks associated with a particular subset set of pieces from the set of puzzle pieces, where the particular subset of pieces associated with a particular chunk are mutually exclusive from other subsets of pieces associated with each of the other chunks, where the particular subset of pieces of each chunk are interconnected, and wherein the plurality of chunks combine to form the complete puzzle image;
   presenting the identified puzzle to a player via a user interface, the presented puzzle illustrating the set of puzzle pieces, where presenting includes prompting, via the user interface, the player to select a particular piece from the set of puzzle pieces as a starting piece;

in response to receiving selection of a particular piece by the player via the user interface, identifying a chunk from the subset of chunks associated with and including the particular piece;

presenting, via the user interface, a chunk interface area for solving the identified chunk associated with and including the particular piece, where the chunk interface area includes a solution area for solving the identified chunk and a player hand area for providing potential pieces for solving the identified chunk, wherein presenting the chunk interface area includes replacing the presentation of the identified puzzle with the chunk interface area in the user interface, and wherein upon initial presentation of the chunk interface, the solution area includes the selected piece and the player hand area includes the remaining pieces associated with and used to complete the chunk;

identifying, via the user interface, a user input selection of a particular one of the potential pieces from the player hand area; and monitoring a user input-based placement of the particular potential piece at a location within the chunk interface area.

2. The method of claim 1, wherein the player hand area is presented adjacent to a bottom edge of the user interface.

3. The method of claim 2, wherein the player hand area is populated with a set of potential pieces for solving the identified chunk, and wherein the identified chunk is solved by receiving placement of the potential pieces into the solution area in locations relative to previously placed pieces.

4. The method of claim 3, wherein the player hand area is configured to present a first number of potential pieces, and wherein the set of potential pieces for solving the identified chunk includes a second number higher than or equal to the first number, the method comprising:

providing a first set of potential pieces for solving the identified chunk in the player hand area;

determining that all pieces in the first set of provided potential pieces have been played; and in response to the determination, providing a second set of potential pieces for solving the identified chunk in the player hand area if the puzzle is not solved.

5. The method of claim 3, where the set of potential pieces for solving the identified chunk includes the addition of at least one dud piece.

6. The method of claim 5, wherein the at least one dud piece comprises an altered version of a piece in the set of potential pieces, wherein the at least one dud cannot be placed within the identified chunk and the current puzzle.

7. The method of claim 5, wherein the at least one dud piece comprises a piece included in a different chunk than the identified chunk, wherein the at least one dud cannot be placed within the identified chunk.

8. The method of claim 5, wherein the selected particular one of the potential pieces from the player hand is a dud piece, wherein the score associated with the monitored user input-based placement of the potential piece is based on a determination of whether the dud piece was placed in a discard location within the solution area or the player hand area.

9. The method of claim 1, wherein the score associated with the monitored user input-based placement of the potential piece is based on an accuracy-based determination of where the potential piece is placed as compared to a correct location in the identified chunk where the potential piece is to be placed.

10. The method of claim 1, wherein the user input-based placement comprises a dragging input via the user interface from the potential piece in the player hand to the location of the placement, wherein the score associated with the monitored user input-based placement of the potential piece is based on a route of the dragging input from the player hand to the location of the placement of the potential piece.

11. The method of claim 1, further comprising:

in response to determining completion of the identified chunk, presenting a puzzle frame for placement of the completed chunk;

monitoring a touch-based placement of the completed chunk within the puzzle frame in a relative position within the complete puzzle image; and assigning a score selected from a set of three or more numbers and associated with the monitored touch-input based placement of the particular completed chunk relative to a correct location within the puzzle frame.

12. The method of claim 11, further comprising:

in response to the placement of the completed chunk, determining if additional chunks remain to be completed within the puzzle;

in response to determining that no further chunks remain, completing the puzzle;

in response to determining that additional chunks remain to be completed:

presenting all completed chunks within the puzzle frame;

presenting an indication of each of the puzzle pieces not included in a previously completed chunk within the puzzle frame; and prompting, via the user interface, the player to select a new particular piece from the indicated puzzle pieces not included in a previously completed chunk as a starting piece;

in response to receiving selection of the new particular piece by the player, identifying the new chunk associated with the new particular piece; and presenting the chunk interface area for solving the identified new chunk associated with and including the new particular piece, where the area includes a solution area for solving the identified new chunk and a player hand area for providing potential pieces for solving the identified new chunk.

13. The method of claim 1, further comprising:

assigning a score whose value is calculated based upon at least one of: a user input-based placement of the particular potential piece in the chunk interface area relative to a correct location within the identified chunk based on the location of the selected piece within the identified chunk and a path the particular potential piece traversed from the player hand area to the user input-based placement of the particular potential piece in the chunk interface area.

14. A non-transitory, computer-readable medium storing one or more computer-readable instructions executable by a hardware processor and configured to:

identify a puzzle for use in a jigsaw puzzle application, the puzzle comprising a set of puzzle pieces which combine to form a complete puzzle image, each of the puzzle pieces illustrating a portion of the complete puzzle image;

divide the identified puzzle into a plurality of chunks, each chunk of the plurality of chunks associated with a a particular subset set of pieces from the set of puzzle pieces, where the particular subset of pieces associated with a particular chunk are mutually exclusive from other subsets of pieces associated with each of the other chunks, where the particular subset of pieces of each chunk are interconnected, and wherein the plurality of chunks combine to form the complete puzzle image;

present the identified puzzle to a player via a user interface, the presented puzzle illustrating the set of puzzle pieces, where presenting includes prompting, via the user interface, the player to select a particular piece from the set of puzzle pieces as a starting piece;

in response to receiving selection of a particular piece by the player via the user interface, identify a chunk from the plurality of chunks associated with and including the particular piece;

present, via the user interface, a chunk interface area for solving the identified chunk associated with and including the particular piece, where the chunk interface area includes a solution area for solving the identified chunk and a player hand area for providing potential pieces for solving the identified chunk, wherein upon initial presentation of the chunk interface, the solution area includes the selected piece and the player hand area includes the remaining pieces associated with and used to complete the chunk;

identify, via the user interface, a user input selection of a particular one of the potential pieces from the player hand area;

monitor, via the user interface, a user input-based placement of the particular potential piece at a location within the chunk interface area; and assign a score selected from a set of three or more numbers and associated with the monitored user input-based placement of the particular potential piece in the chunk interface area relative to a correct location within the identified chunk based on the location of the selected piece within the identified chunk.

15. The medium of claim 14, wherein the player hand area is presented adjacent to a bottom edge of the user interface, and wherein the player hand area is populated with a set of potential pieces for solving the identified chunk, and wherein the identified chunk is solved by receiving placement of the potential pieces into the solution area in locations relative to previously placed pieces.

16. The medium of claim 15, wherein the player hand area is configured to present a first number of potential pieces, and wherein the set of potential pieces for solving the identified chunk includes a second number higher than or equal to the first number, the instructions further configured to:

provide a first set of potential pieces for solving the identified chunk in the player hand area;

determine that all pieces in the first set of provided potential pieces have been played; and in response to the determination, provide a second set of potential pieces for solving the identified chunk in the player hand area if the puzzle is not solved.

17. A system, comprising:
a computing device; and
a computer-readable storage device coupled to the computing device and having instructions stored thereon which, when executed by the computing device, cause the computing device to perform operations comprising:

identifying a puzzle for use in a jigsaw puzzle application, the puzzle comprising a set of puzzle pieces which combine to form a complete puzzle image, each of the puzzle pieces illustrating a portion of the complete puzzle image;

dividing the identified puzzle into a plurality of chunks, each chunk of the plurality of chunks associated with a particular subset set of pieces from the set of puzzle pieces, where the particular subset of pieces associated with a particular chunk are mutually exclusive from other subsets of pieces associated with each of the other chunks, where the particular subset of pieces of each chunk are interconnected, and wherein the plurality of chunks combine to form the complete puzzle image;

presenting the identified puzzle to a player via a user interface, the presented puzzle illustrating the set of puzzle pieces, where presenting includes prompting, via the user interface, the player to select a particular piece from the set of puzzle pieces as a starting piece;

in response to receiving selection of a particular piece by the player via the user interface, identifying a chunk from the plurality of chunks associated with and including the particular piece;

presenting, via the user interface, a chunk interface area for solving the identified chunk associated with and including the particular piece, where the chunk interface area includes a solution area for solving the identified chunk and a player hand area for providing potential pieces for solving the identified chunk, wherein presenting the chunk interface area includes replacing the presentation of the identified puzzle with the chunk interface area in the user interface, and wherein upon initial presentation of the chunk interface, the solution area includes the selected piece and the player hand area includes the remaining pieces associated with and used to complete the chunk;

identifying, via the user interface, a user input selection of a particular one of the potential pieces from the player hand area; and monitoring, via the user interface, a user input-based placement of the particular potential piece at a location within the chunk interface area.

18. The system of claim 17, wherein the player hand area is presented adjacent to a bottom edge of the user interface, and wherein the player hand area is populated with a set of potential pieces for solving the identified chunk, and wherein the identified chunk is solved by receiving placement of the potential pieces into the solution area in locations relative to previously placed pieces.

19. The system of claim 18, where the set of potential pieces for solving the identified chunk includes the addition of at least one dud piece, and wherein the at least one dud piece comprises one of:

an altered version of a piece in the set of potential pieces, wherein the at least one dud cannot be placed within the identified chunk and the current puzzle; or a piece included in a different chunk than the identified chunk, wherein the at least one dud cannot be placed within the identified chunk.

20. The system of claim 17, further comprising:

assigning a score whose value is calculated based upon at least one of: a user input-based placement of the particular potential piece in the chunk interface area relative to a correct location within the identified chunk based on the location of the selected piece within the identified chunk and a path the particular potential piece traversed from the player hand area to the user input-based placement of the particular potential piece in the chunk interface area.

* * * * *

UNITED STATES PATENT AND TRADEMARK OFFICE
CERTIFICATE OF CORRECTION

PATENT NO. : 10,646,773 B2
APPLICATION NO. : 15/087164
DATED : May 12, 2020
INVENTOR(S) : Carl Henry McKevitt and Albert Gallatin McDaniel, V Page 1 of 1

It is certified that error appears in the above-identified patent and that said Letters Patent is hereby corrected as shown below:

In the Claims

Column 24, Lines 64-65, Claim 14, delete "a a" and insert -- a --.

Signed and Sealed this
Twenty-fifth Day of August, 2020

Andrei Iancu
*Director of the United States Patent and Trademark Office*